(12) United States Patent
Han et al.

(10) Patent No.: US 6,392,645 B1
(45) Date of Patent: May 21, 2002

(54) THREE DIMENSIONAL GEOMETRIC MODELING SYSTEM

(75) Inventors: Tao-Yang Han; Chien-Ming Huang, both of Marietta, GA (US)

(73) Assignee: Alventive Inc., Santa Clara, CA (US)

( * ) Notice: Subject to any disclaimer, the term of this patent is extended or adjusted under 35 U.S.C. 154(b) by 0 days.

(21) Appl. No.: 09/267,774

(22) Filed: Mar. 15, 1999

(51) Int. Cl.⁷ .............................................. G06T 17/00
(52) U.S. Cl. ...................................... 345/420; 345/619
(58) Field of Search ................................ 345/420, 619

(56) References Cited

U.S. PATENT DOCUMENTS 5,861,889 A * 1/1999 Wallace et al. ............. 345/433
5,894,310 A * 4/1999 Arsenault et al. ........... 345/433

\* cited by examiner

*Primary Examiner*—Mark Zimmerman
*Assistant Examiner*—Lance W. Sealey
(74) *Attorney, Agent, or Firm*—Nixon & Vanderhye, P.C.

(57) ABSTRACT

A computer program product and system executing/implementing the same provides a visual depiction of a three dimensional object upon a display device. The program converts feature-based data structure of a designated solid shape to a direct face data structure of the designated solid shape in a manner to keep a history of the three dimensional object consistent with a resulting boundary representation component of the three dimensional object. In converting the feature-based data structure of the designated solid shape to the direct face data structure, the program (1) determines what other solid shapes should be included in the D-Shape; (2) generates a boundary representation for the designated solid shape; (3) uses a topology-changeable local operation to generate a modified boundary representation for the designated solid shape; (4) modifies the history of the three dimensional object; (5) includes the modified boundary representation for the designated solid shape with the data structure for the solid shape; and (6) updates at least part of a history of the three dimensional object. Further, the program product can reconstruct a feature-based data structure from a direct face data structure (D-Shape). In one automatic mode of face selection, the reconstruction process grows a selected face until a recognizable boundary is encountered. The recognizable boundary can be any one of a blend, direct face solid shape, extruded shape, or turn shape.

70 Claims, 25 Drawing Sheets

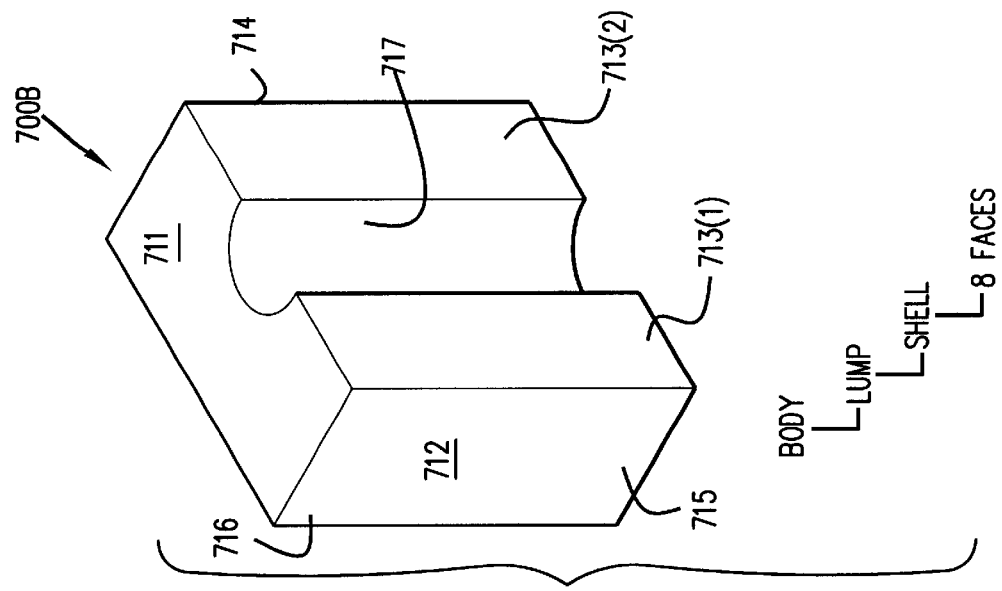
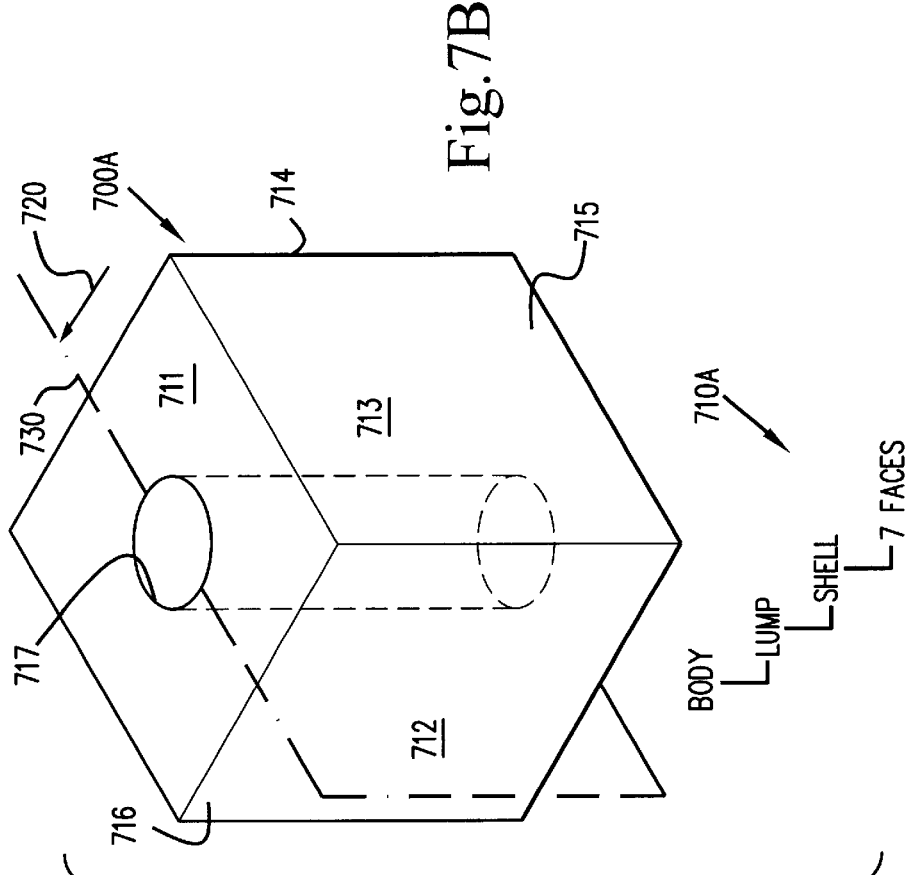
Fig.7B
Fig.7A

THREE DIMENSIONAL GEOMETRIC MODELING SYSTEM

BACKGROUND

1. Field of the Invention

The present invention pertains to computerized three dimensional geometric modeling systems, and particularly to a three dimensional geometric modeling system which permits a combination of differing data structure/modeling representation types to be utilized for representing solid shapes comprising a part or scene.

2. Related Art and Other Considerations

The computer has greatly affected essentially all forms of information management, including the geometric modeling arts. Nowadays there are numerous computer program products that allow the user to create, store, and modify geometric models and their graphical renderings of various types on a display screen, and to print or otherwise output such geometric models and their renderings. Such geometric models and their graphical renderings span the gambit from simple to complex, and can vary in subject matter, e.g., artistic, industrial, etc. Some geometric modeling computer program products are two dimensional, providing only length and width dimensions of objects. The more complex three dimensional computer program products, on the other hand, provide three dimensions—length, width, and depth/thickness.

Three dimensional geometric modeling programs can generate a scene or part which can comprise one or more constituent 3D solid shapes. For example, a scene featuring a simple table would comprise a solid shape for each leg of the table, as well as a solid shape for a flat table top. The geometric modeling computer program typically has an executable object used to define and generate each solid shape. The object for each solid shape can have several components, the components being a combination of executable code and data structure. For example, a boundary representation ("B-rep") component includes a data structure describing the geometry and topology data for the solid shape (e.g., length, width, depth, and coordinates of the solid part).

Most three dimensional geometric modeling programs employ a feature-based parametric modeling technique. In feature-based parametric modeling, the executable object for each solid shape has not only a boundary representation component, but also a history or creation component which includes a data structure reflecting how a solid shape has been created. That is, the history/creation component includes data which indicates an order or chronological sequence of steps employed to construct the solid shape. For a simple solid block, for example, the history/creation component may indicate that the solid block began as a simple two dimensional rectangle that was extruded into a third dimension. U.S. patent application Ser. No. 08/635,293, filed Apr. 19, 1996, entitled "Intelligent Shapes For Authoring Three-Dimensional Models", incorporated herein by reference, discloses solid shapes having various other components in addition to boundary representation and historical components: a visual component; a physical component; a functional component; and a behavioral component.

Solid parts can be formed from other solid parts. This happens often, for example, in an assembly drawing comprised of one or more sub-assemblies and solid parts. In geometric modeling terms, the building of more complicated solid shapes in hierarchical fashion from simpler solid shapes (known as "primitives") is known as "constructed solid geometry" ("CSG"). The simpler solid shapes can be combined using various operations (e.g., Boolean operations such as "and", "or", "not", etc.). The computer stores the overall (complex) solid shape as a tree, each of the "leaves" of the tree comprising a primitive solid shape.

Typically, when the user wants to modify a feature-based solid shape by changing any aspect of the solid shape, the feature-based parametric modeling technique re-evaluates the entire solid shape, e.g., goes through the entire CGS history tree in order to revise the part in accordance with the change. For example, if the user wanted to lengthen the table top of the table described above, another solid shape would be added adjacent to the previous table top. In so adding another solid shape corresponding to the increased length of the table top, another step is added to the CSG history. Alternatively, the user may modify the 2D profile of the table top and let the program to re-evaluate the solid shape of the table.

Thus, modifying solid shapes using feature-based parametric modeling can be inefficient. Moreover, in some instances a modification attempted by a user in a feature-based parametric modeling may provide a result different than that expected by the user.

An alternate approach to feature-based parametric modeling is known as direct face modeling. The direct face parametric modeling technique allows for face editing of a solid shape or feature. For example, in the table illustration provided above, the user can simply click and pull on the table top, resulting in an elongation of the table top. Such a modification in the direct face parametric modeling does not result in re-evaluation of the entire solid shape. In fact, in direct face parametric modeling there is no historical information associated with a solid shape. That is, a direct face-modeled solid shape does not include any history or creation information.

What is needed, and an object of the present invention, is a three dimensional computer aided geometric modeling system which combines desirable aspects of both feature-based parametric modeling and direct face parametric modeling techniques.

BRIEF SUMMARY OF THE INVENTION

A computer program product and system executing/implementing the same provides a visual depiction of a three dimensional object upon a display device. The program initially uses a feature-based data structure for plural solid shapes comprising the three dimensional object. Besides providing traditional feature-based modeling capabilities, when input from the user input device designates a designated solid shape, the computer program product creates a direct face data structure (D-Shape) for the designated solid shape. The user input can take the form of a command that the designated solid shape be converted from a feature-based data structure to a direct face data structure, or movement of a face or surface in a manner requiring direct face modeling. The program converts the feature-based data structure of the D-Shape to a direct face data structure in a manner to keep a history of the three dimensional object consistent with a resulting boundary representation component of the three dimensional object.

In converting the feature-based data structure of the designated solid shape to the direct face data structure, the program (1) determines what other solid shapes should be included in the D-Shape; (2) generates a boundary representation for the D-Shape; (3) uses a topology-changeable local operation to generate a modified boundary representation for the D-Shape; (4) modifies the history of the three dimensional object; (5) includes the modified boundary representation for the D-Shape with the data structure for the solid shape; and (6) updates at least part of a history of the three dimensional object.

In determining if the direct face data structure should also encompass any solid shapes, the program considers whether any of the following should be combined in the direct face data structure: (1) adjacent solid shapes which are adjacent the designated solid shape; (2) depending solid shapes that are included in a definitional component of any other solid shape that is to be converted to a direct face data structure; (3) space overlapping solid shapes that have a spatial overlap with the designated solid shape and have conflicting order requirements.

Further, the program product and methods of the invention can construct/reconstruct a feature-based data structure from a direct face data structure (D-Shape) or from user-selected faces. The faces to be included in a new feature-based data structure can be manually selected by the user by clicking seriatim on the faces, or by using an auto-select feature. In the auto-select feature, the reconstruction process grows a selected face until a recognizable boundary is encountered. The recognizable boundary can be any one of a blend, direct face solid shape, extruded shape, or turn shape.

Once a type of selected shape has been determined from the selection, the construction/reconstruction process of the invention removes the selected faces from a boundary representation component of the D-Shape, and thereafter heals the boundary representation component of the D-Shape. A boundary representation component is then prepared for the removed faces, and an executable objected is created to include the newly prepared boundary representation component. The history of compound solid shape in which the newly created solid shape is to be included is modified, and the newly created feature-based solid shape is included in the CSG tree of the compound solid shape. The CSG tree can then be re-evaluated for display of the compound solid shape including the newly feature-based converted/reconverted solid shape.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7A and FIG. 7B are partial isometric, partial diagrammatic views showing a solid shape and its topology information before and after modification, respectively.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
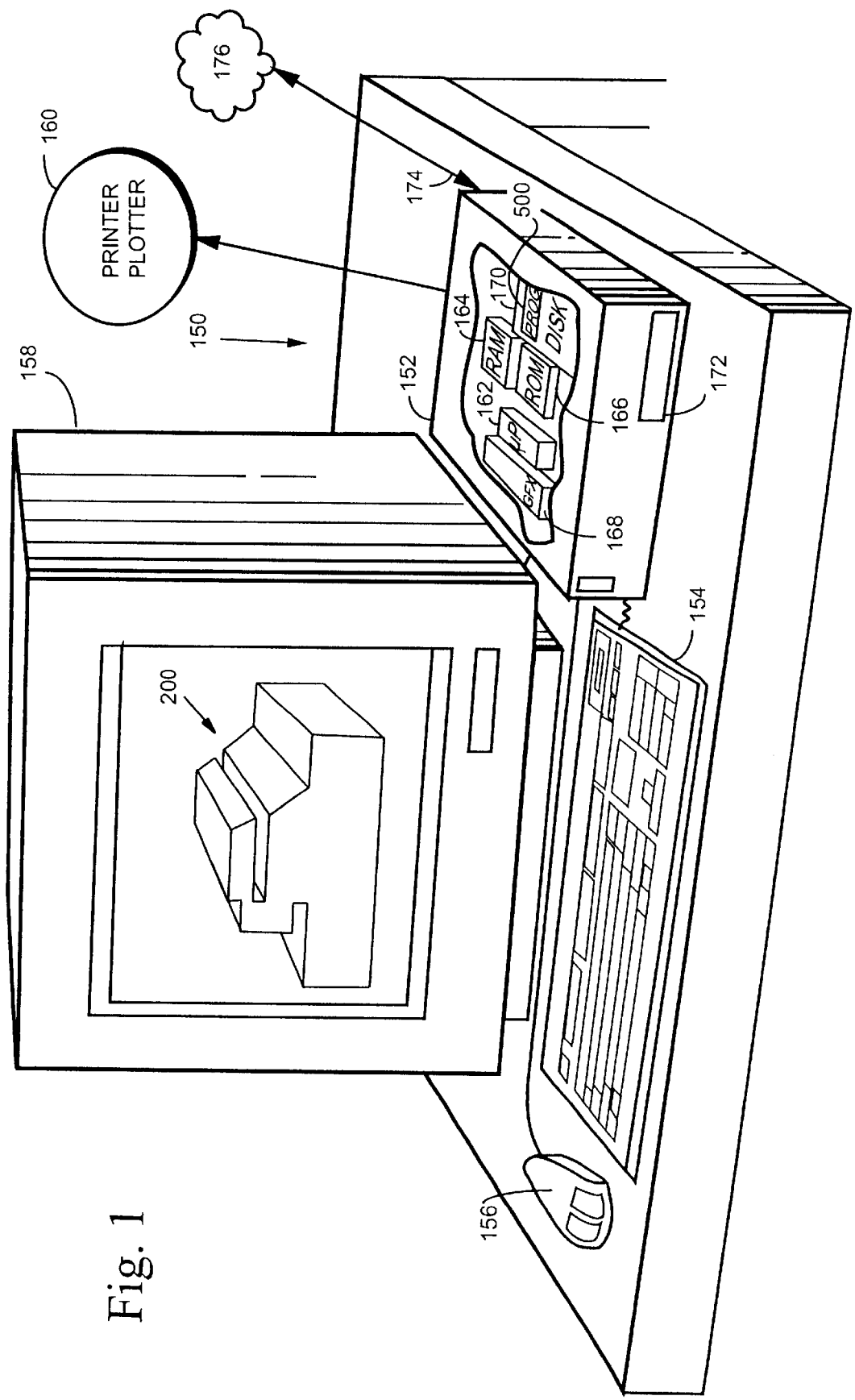
FIG. 1 is a schematic view of an example computer geometric modeling workstation according to an embodiment of the invention.

FIG. 1 shows an example computer graphics workstation 150 accordingly to an embodiment of the invention. Workstation 150 includes a general purpose computer 152, a keyboard 154, a mouse pointing device 156, a display 158, and a printer/plotter 160. Computer 152 may be, for example, a conventional microcomputer such as an IBM compatible personal computer including a microprocessor 162, random access memory 164, read only memory 166, a graphics video adapter 168, a mass storage device such as a magnetic disk 170, and an optical and/or floppy diskette drive 172. Computer 152 displays images on display 158 (and/or prints the images on printer/plotter 160) in response to user inputs via keyboard 154 and/or mouse pointing device 156. The computer 152 creates images based on steps it performs under control of a computer program product 500 stored on mass storage device 170 and/or another storage media (e.g., an optical or magnetic disk, not shown) provided via drive 172. A communications connection 174 between computer 152 and a network 176 (e.g., the Internet) may be provided to allow the user to access information from the network and/or exchange information with another computer also connected to the network.

Figure 2A:
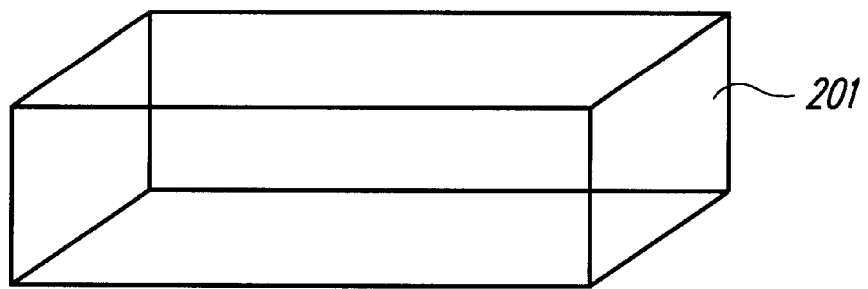
FIG. 2A–FIG. 2D are isometric views of four solid shapes.
Figure 2B:
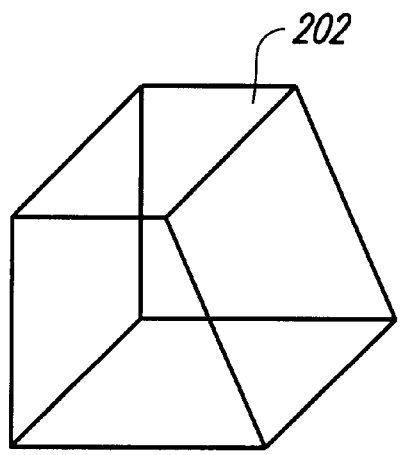
Figure 2C:
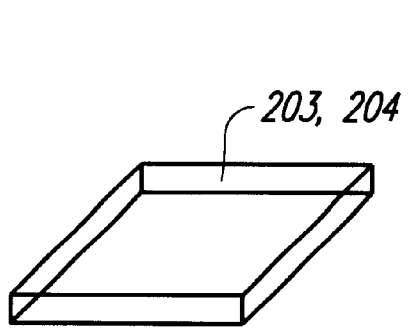
Figure 2D:
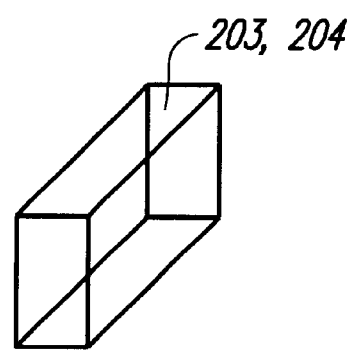
Figure 3A:
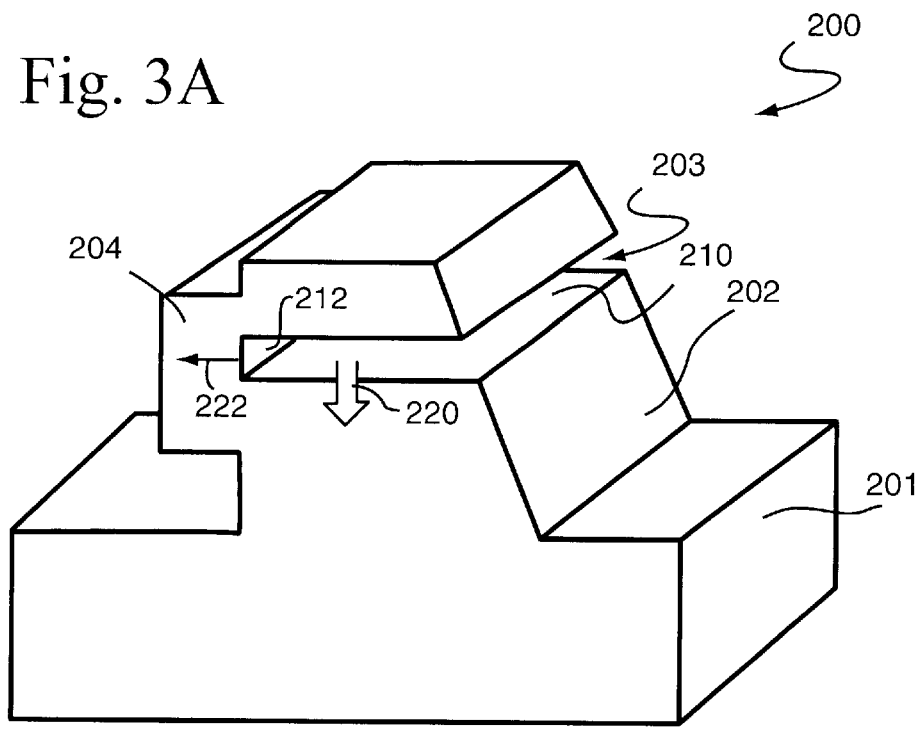
FIG. 3A is an isometric view of a solid part comprised of the solid shapes of FIG. 2A–FIG. 2D.

An enlargement of the particular image 200 displayed on display 158 in FIG. 1 is shown in FIG. 3A. The image 200 is a type of solid shape known as part and comprises a Boolean combination of the four solid shapes 201, 202, 203, and 204 shown in FIG. 2A–FIG. 2D, respectively. As understood from FIG. 2A–FIG. 2D, solid shape 201 is a large rectangular block; solid shape 202 is an angularly truncated rectangular block; solid shape 203 is a rectangular hole; and solid shape 204 is a small narrow rectangular block. The image 200 is generated by first creating solid shape 201, then situating the solid shape 202 centrally on an upper surface of solid shape 201. The solid shape 203, the rectangular hole, is then carved out of solid shape 202. The solid shape 204 is then attached to a left side of solid shape 202, above but not touching the upper surface of solid shape 201. The formation of the hole using solid shape 204 results in the hole having a lower horizontal surface 210 and a left vertical surface 212.

Figure 4A:
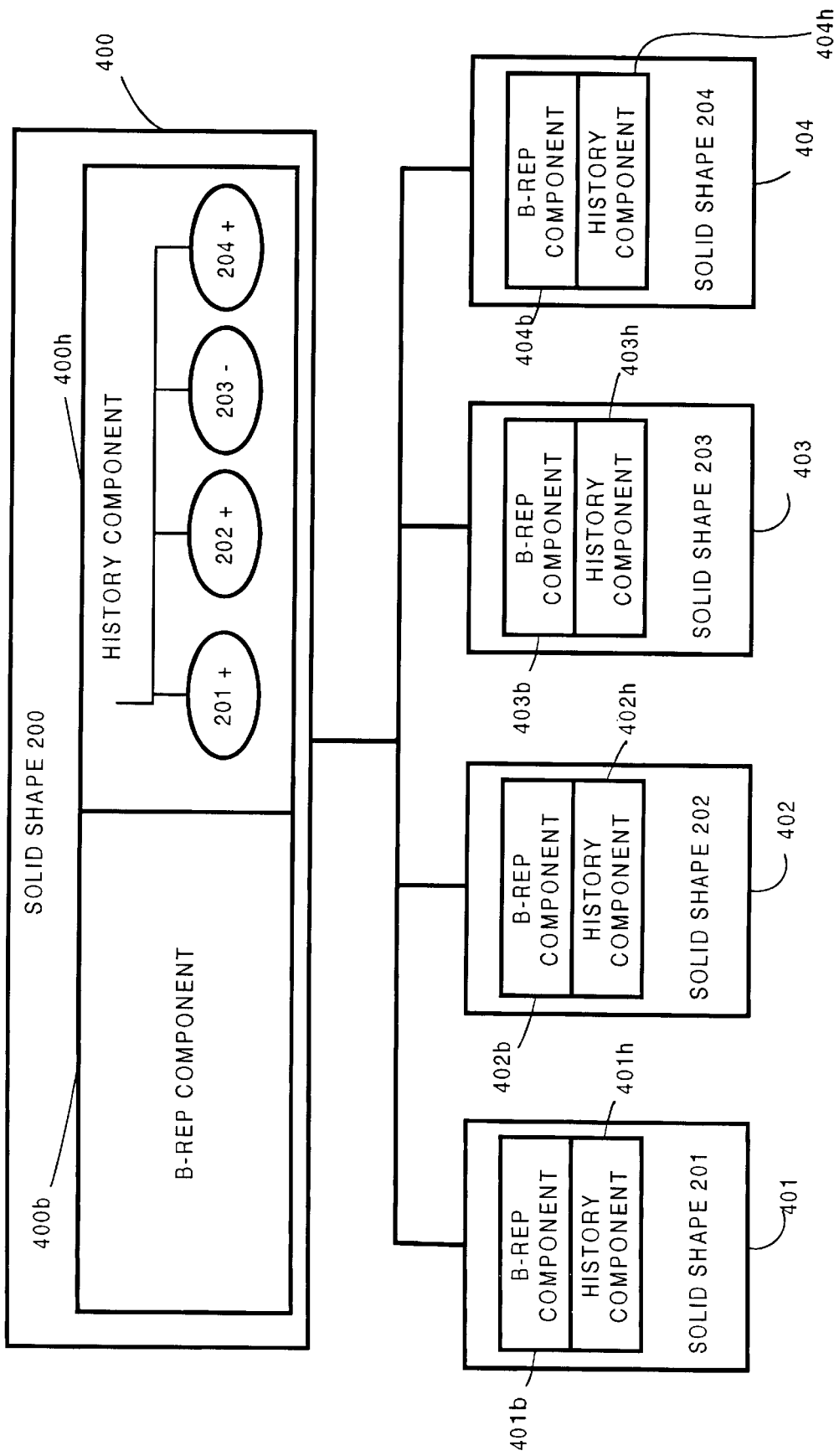
FIG. 4A is a diagrammatic view of a CSG tree for the solid part of FIG. 3A.

The image or part 200 shown in FIG. 2A is itself a solid shape comprised of the solid shapes 201–204. Each of the solid shapes 200–204 shown in FIG. 3A has a corresponding executable object which is shown in the CSG tree of FIG. 4A. In particular, solid shapes 200 through 204 have the respective executable objects 400–404. Since the solid shapes are represented using feature-based data structures, each of the executable objects 400–404 includes a boundary representation (B-rep) component and a history/creation component. For example, the feature-based executable object 400 for solid shape 200 has a B-rep component 400b and a history/creation component 400h. Each of the components can include executable instructions and a data structure. For the particular solid shape 200 shown in FIG. 3A, the history/creation component 400h is shown as including a data structure which depicts the creation information. In this regard, history/creation component 400h shows (by a sequential reading from left to right) that solid shape 200 was created first by adding (depicted by the plus [+] sign) the solid shape 201, followed by adding the solid shape 202, followed by cutting out the hole of solid shape 203, followed by adding the solid shape 204. More detailed architecture of a solid shape, including buses coupled to constituent components of a solid shape, is discussed and illustrated in U.S. patent application Ser. No. 08/635,293, filed Apr. 19, 1996, entitled "Intelligent Shapes For Authoring Three-Dimensional Models", incorporated herein by reference.

Returning to FIG. 3A, suppose that a user desires to modify the solid shape 200 so that the horizontal surface 210 of hole 203 is lowered (in the direction depicted by arrow 220 in FIG. 3A) and vertical surface 212 of hole 203 is moved leftward (in the direction depicted by arrow 222 in FIG. 3A). Such surface movement might be attempted, for example, by clicking and dragging on the respective surfaces 210 and 212 in the directions of arrows 220 and 222. One might expect for the image of FIG. 3B to result, with a lowered horizontal surface 210' and a leftward-moved vertical surface 212'. However, in view of the historical component of the feature-based solid shapes, instead the image of FIG. 3C appears. As shown in FIG. 3C, not only does a lower horizontal surface 210" result, but also a lip 230 formed at the intersection of solid shape 202 and solid shape 203. Moreover, the leftward-moved vertical surface 212" does not move because surface 212 is on solid shape 203, and solid shape 204 is added after solid shape 203. Solid shape 204 adds material back to where material was removed by solid shape 203.

Figure 3B:
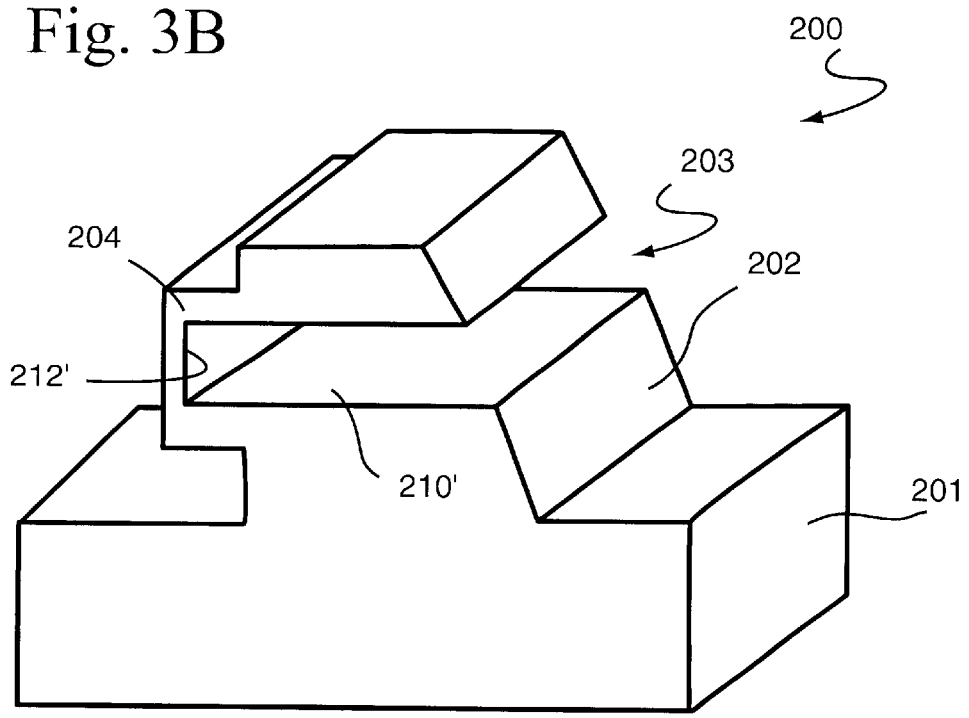
FIG. 3B is an isometric view of an expected change in the solid part of FIG. 3B upon movement of two faces of the solid part.
Figure 3C:
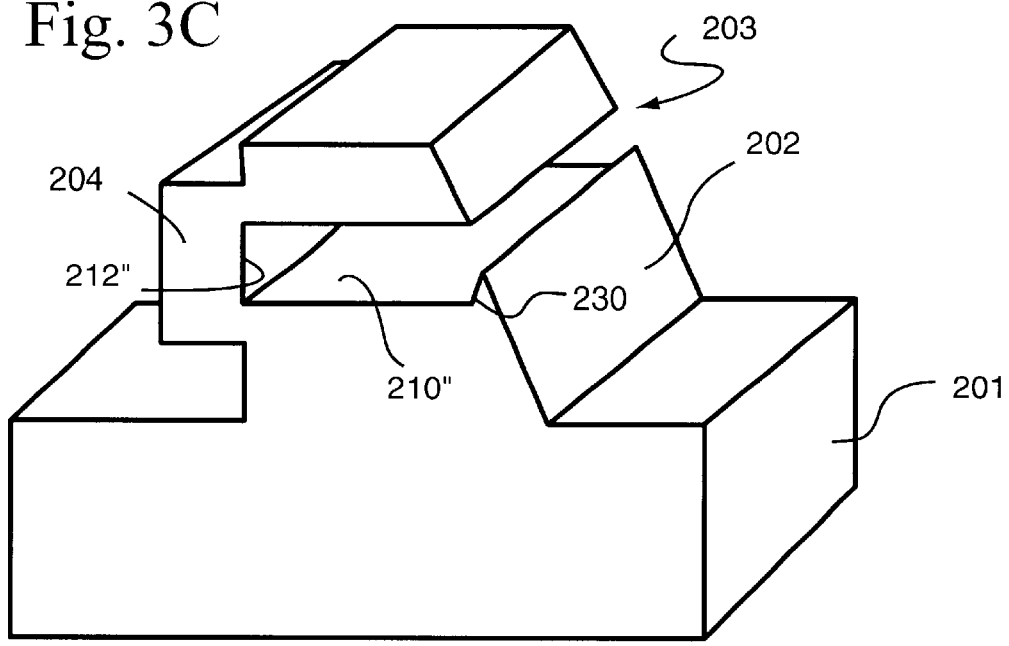
FIG. 3C is an isometric view of an actual change in the solid part of FIG. 3B upon movement of two faces of one of the constituent solid shapes.
Figure 3D:
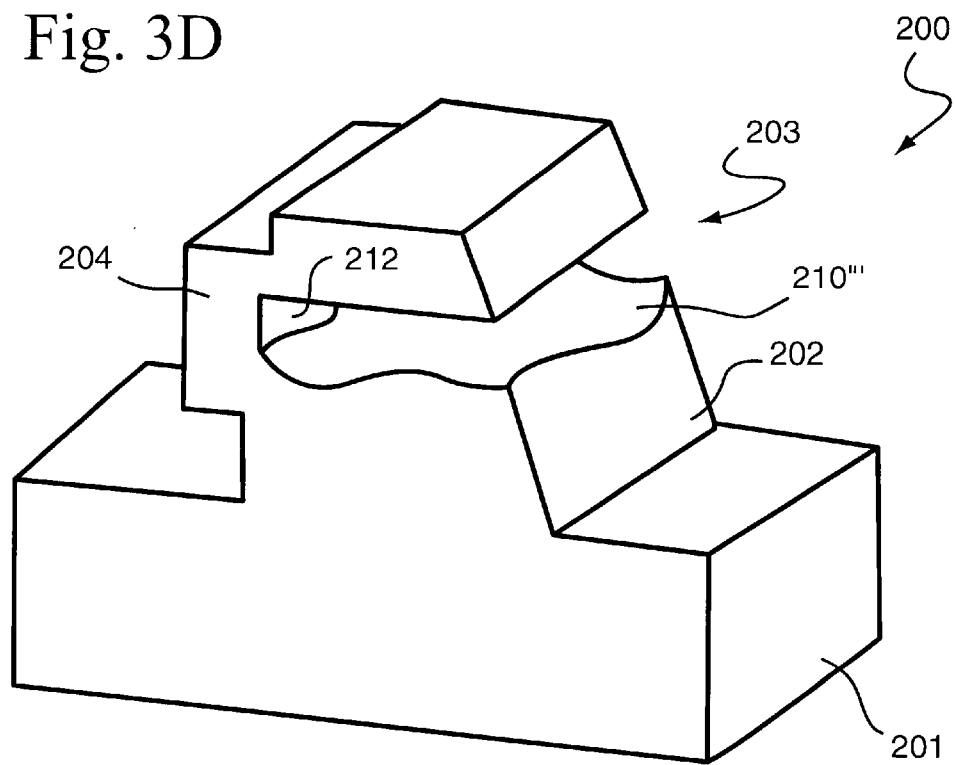
FIG. 3D is an isometric view of an expected change in the solid part of FIG. 3A upon replacing the surface geometry of a face.

As illustrated in FIG. 3D, suppose that a user desires to modify the solid shape 200 so that the geometry of the horizontal surface 210 is replaced by a free form surface 210". It is difficult, if not impossible, for feature-based parametric modeling system to accomplish this result. On the other hand, it is a simple operation for direct face modeling because, e.g., of the topology-changeable local operation capability.

Thus, feature-based parametric modeling has a drawback of not always providing the result that a user expects, particularly when a user attempts to perform a direct face type modification on some solid shape which has a feature-based data structure. In addition, feature-based parametric modeling has a drawback of not being able to perform certain kinds of simple modifications that a user desires. The present invention provides a technique for overcoming the deficiencies of a pure feature-based parametric modeling system by allowing selective conversion of solid shapes from a feature-based representation to a direct face representation (herein known as a "D-Shape"), as well as reconversion of a D-Shape to a feature-based representation.

Figure 5:
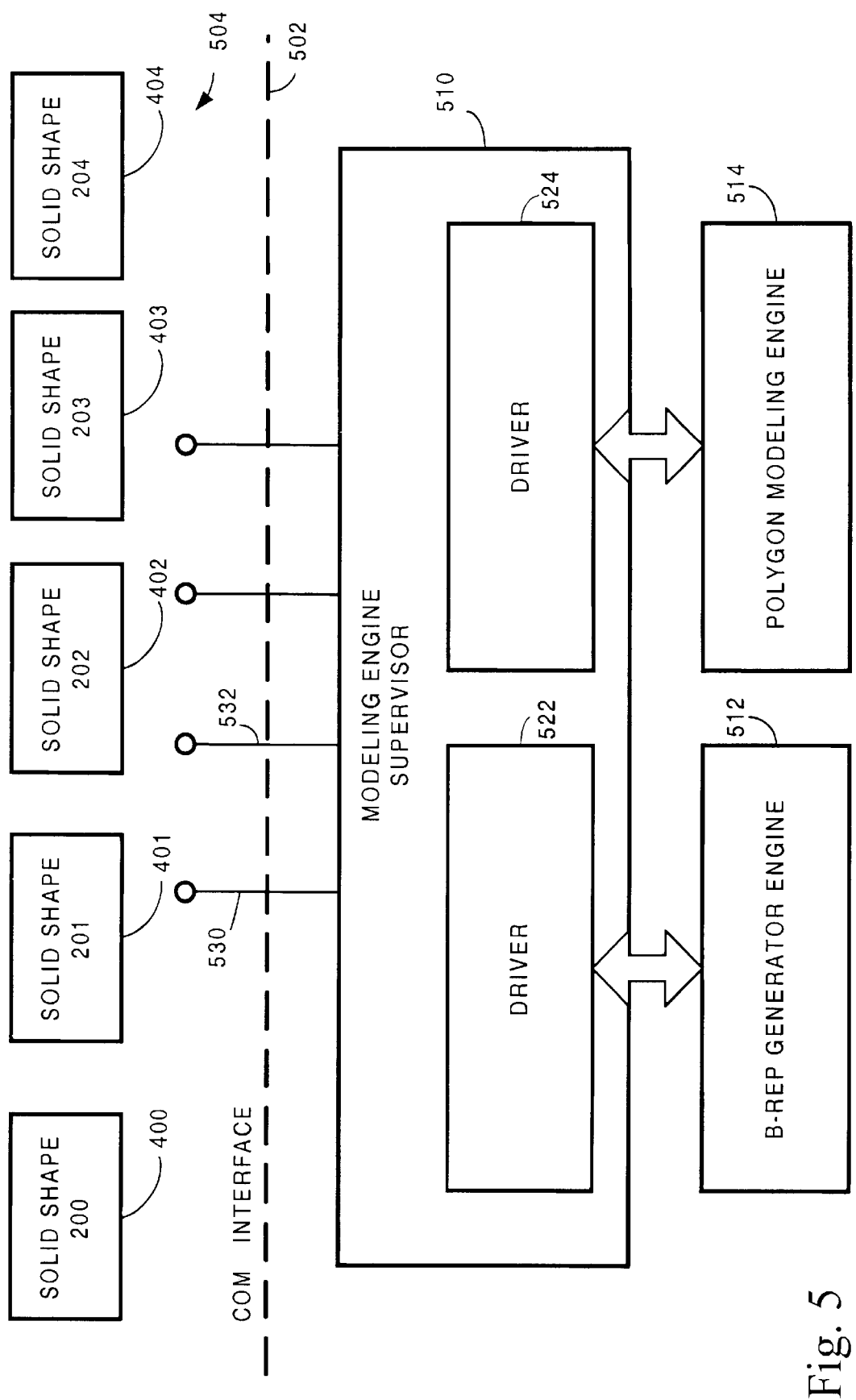
FIG. 5 is a diagrammatic view of basic aspects of a computer program executed by the example computer graphics workstation.

FIG. 5 illustrates basic aspects of a three dimensional geometric modeling computer program product 500 which is stored on disk 172 and executed by microprocessor 162. Program 500 utilizes a COM (Compound Object Model) Interface, represented by broken line 502 in FIG. 5. As shown above, program 500 includes a solid object module 504. Module 504 contains many classes and executable objects (hereinafter referenced as "COM objects"), particularly COM objects 400–404 corresponding to each of solid shapes 200–204, respectively, described above with reference to FIG. 3A. Each COM object 400–404 is an executable object for its corresponding shape 200–204, and further communicates with the geometric computer module of program 500 over COM Interface 502.

The geometric computing module of program 500 (shown below COM Interface 502 in FIG. 5) comprises modeling engine supervisor 510 and two modeling engines: B-rep generator engine 512 and polygonal model engine 514. The modeling engine supervisor 510 has a driver 522 for B-rep engine 512 and a driver 524 for polygonal model engine 514. For purposes of the present invention, the operation of driver 522 (which works in conjunction with B-rep engine 512) is particularly important and described hereinafter. In the illustrated embodiment the B-rep engine 512 is of a type marketed by Spatial Technology Corporation as ACIS, and generates e.g., B-representation bodies and basic topology information.

Details of component object modeling and the operation of COM Interface 502 is understood by those skilled in the art, particularly with reference to such publications as Rogerson, Dale, *Inside COM* (Microsoft Press, 1997), ISBN 1-57231-349-8. Therefore, the reader will appreciate that the symbols depicted by reference numerals 530 and 532 in FIG. 5 are each interfaces, and that each interface comprises one or more function calls. Should a solid shape COM object require processing, the solid shape COM object makes a function call to modeling engine supervisor 510.

In the present invention, the driver 522 is employed for various purposes, including controlling the conversion of feature-based boundary representation data structure(s) to direct face data structure(s) and the reconversion of direct face data structure(s) to feature-based boundary representation data structure(s). Typically these actions result from user input as perceived at one or more of the user input devices (e.g., via keyboard 154 and/or mouse pointing device 156). For example, as explained below, a certain attempted modification of a solid shape (e.g., the lowering of horizontal surface 210 in FIG. 3A) may result in driver 522 realizing that one or more solid shapes require conversion from feature-based modeling to direct face modeling. Alternatively, the user may directly command the conversion from feature-based modeling to direct face modeling for a specified solid shape. As also explained below, even in connection with such commands driver 522 must also determine if solid shapes other than the specified solid shape must additionally be converted in order to implement effectively the requested conversion.

Figure 6:
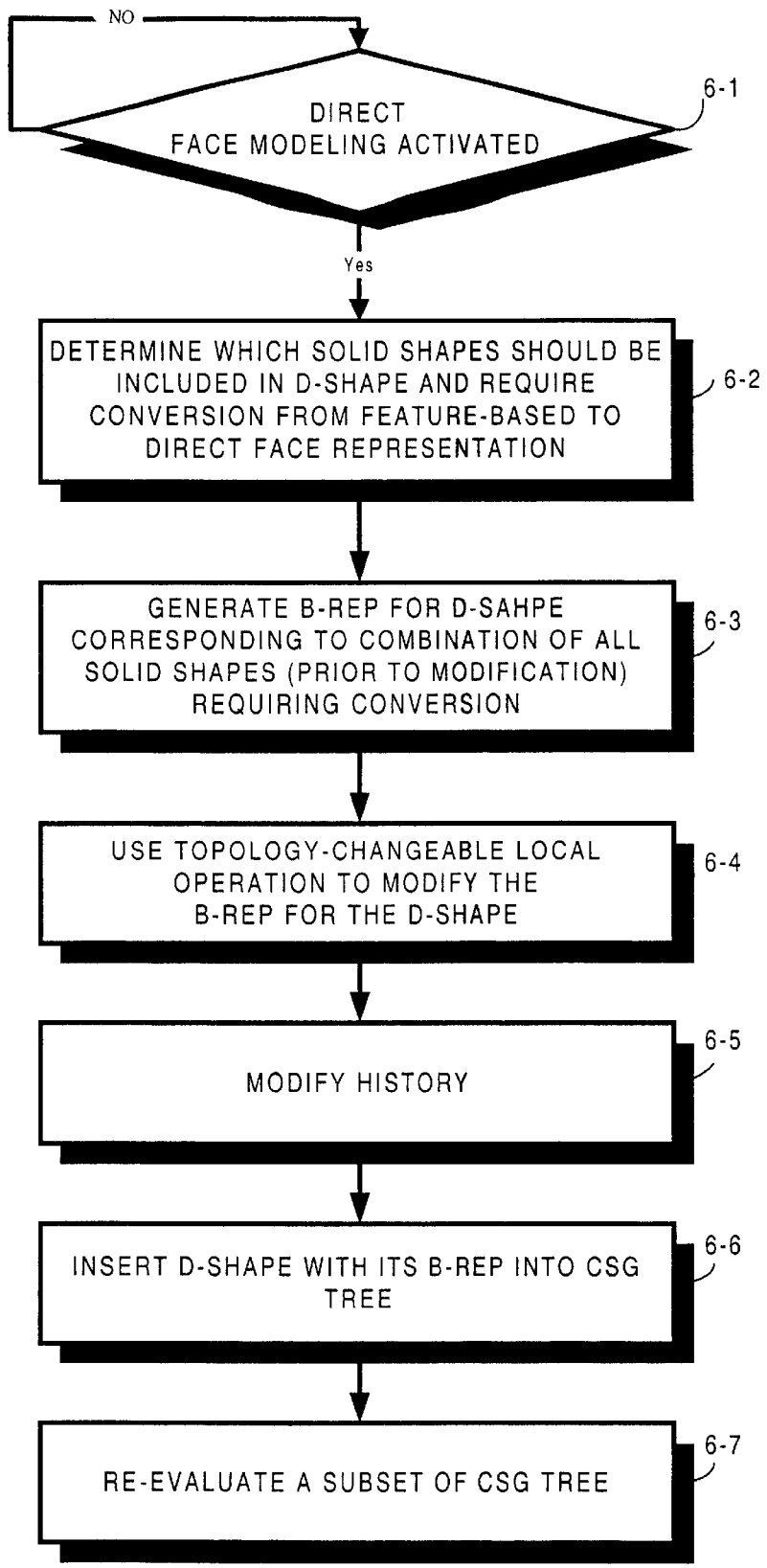
FIG. 6 is a flowchart showing basic steps performed by a driver included in the computer program illustrated in FIG. 5 in connection with a procedure for converting a feature-based representation of a solid shape to a design face representation (D-Shape).

Basic operations performed by driver 522 are depicted in the flowchart of FIG. 6. These operations are discussed in the context of the attempted modification to solid shape 200 as depicted by arrows 220 and 222 in FIG. 3A, particularly the lowering of horizontal surface 210 and leftward movement of vertical surface 212 of solid shape 200.

Figure 13:
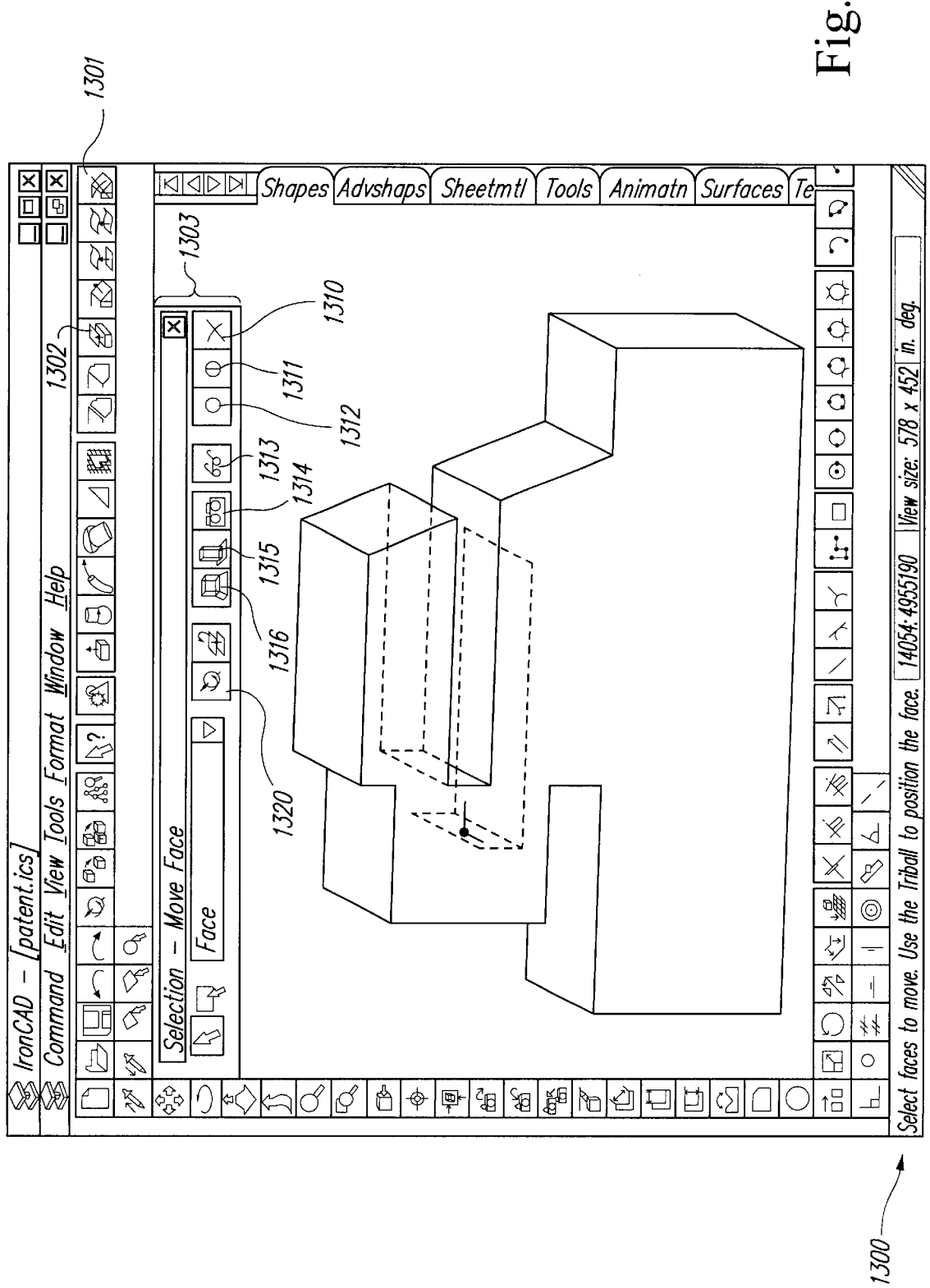
FIG. 13 is a diagrammatic view of a screen showing activation of a direct face modeling option on a tool bar and highlighting of surfaces which have been moved to desired positions in accordance with the direct face modeling option.

In order to move the surfaces 210 and 212 in the direction shown by respective arrows 220 and 222 in FIG. 3A (in an attempt to reach the situation depicted in FIG. 3B), the user first operates a user input device to select a direct face modeling option on a tool bar. In this regard, FIG. 13 shows a screen 1300 generated by program 500, the screen showing activation on main tool bar 1301 of a direct face modeling button 1302 which provides a direct face modeling option. Activating the direct face modeling button 1302 on tool bar 1301 results in the display of direct face modeling or "move face" tool bar 1303 in the manner shown in FIG. 13. In the situation depicted in FIG. 13, activation of direct face modeling button 1302 has been followed by clicking on and dragging each of the surfaces 210 and 212 to their desired positions similar to those shown in FIG. 3B. At the juncture shown on screen 1300, the surfaces 210 and 212 are highlighted to show that they have been moved to desired positions in accordance with the direct face modeling option.

As an aside, other aspects of the format of direct face modeling or "move face" tool bar 1303 of screen 1300 of FIG. 13 are briefly discussed. Proceeding from the right edge of tool bar 1303, there are provided the following seven buttons: cancel button 1310; execute but do not exit button 1311; execute and exit button 1312; preview button 1313; copy button 1314; extend face button 1315; and extend face creating new side face(s) button 1316. The button 1316 extends the horizontal face shown in the icon of the button, and in so doing forms side faces perpendicular thereto (rather than extensions of the inclined ramp faces shown in the icon). In addition, tool bar 1310 has button 1320 for invoking an object movement tool known as TriBall®. An example of such a tool is shown in U.S. Pat. No. 5,861,889 to Wallace et al., which is incorporated herein by reference.

From the perspective of driver 522, the activation of the direct face modeling option is detected at step 6-1. Once the direct face modeling option has been selected and the direct face modifications requested (e.g., the moving of surfaces 210 and 212 in FIG. 3A), at step 6-2 driver 522 determines which solid shapes require conversion from feature-based modeling representation to direct face modeling representation. Factors involved in this determination are explained subsequently. As it turns out, in the situation illustrated in FIG. 3A, not only must solid shape 203 (the hole) be converted from a feature-based modeling representation to a direct face modeling representation, but also solid shapes 202 and 204 as well. Suffice it for the present in this regard to point out first (with regard to solid shape 202) that the horizontal extent of solid shape 203 (i.e., in the horizontal dimension across the sheet of the drawing) as originally constructed is not large enough, when surface 210 is deepened, to cut horizontally all the way across solid shape 202 (which would result in the lip 230 shown in FIG. 3C). With regard to solid shape 204, the vertical movement of surface 212 in the direction of arrow 222 in FIG. 3A causes solid shape 203 (the hole) to take material away from solid shape 204. However, as seen in historical/creation component 400*h* in FIG. 4A, creation of solid shape 204 succeeded creation of solid shape 203 and involved addition of material. So if solid shape 204 were not included in the conversion from feature-based to direct face modeling, then upon re-evaluation of the CSG tree there would be no penetration of solid shape 203 into solid shape 204, as shown in FIG. 3C.

After it is determined at step 6-2 what solid shapes require conversion from feature-based modeling to direct face modeling, at step 6-3 driver 522 causes engine 512 to generate a boundary representation component for a "D-Shape" solid shape. The first D-Shape solid shape generated at step 6-3 is a combination of all solid shapes (prior to the modification) which (as determined at step 6-2) require conversion. Recalling step 6-2 in the context of FIG. 3A, it was determined that solid shapes 202, 203, and 204 would each require conversion in order to implement the modification shown by arrows 220 and 222. Therefore, at step 6-3, driver 522 orders engine 512 to develop a boundary representation data structure for a solid shape which is the combination of solid shapes 202, 203, and 204 prior to the attempted modification (i.e., prior to lowering of surface 210 and leftward movement of surface 212).

As used herein, a D-Shape is a solid shape which has a boundary representation information (e.g., B-rep component) but not creation or history information. A D-Shape can have other components, including intelligent components, but not a historical or creation component.

After the D-Shape with its boundary representation component has been constructed by engine 512 as requested by driver 522, at step 6-4 the driver 522 invokes a topology-changeable local operation, which is part of the driver 522 itself, to modify the boundary representation for the D-Shape created at step 6-3. In other words, at step 6-3 the boundary representation data structure gave the D-Shape an appearance resulting from the combination of solid shapes 202, 203 and 204 in FIG. 3A. After the topology-changeable local operation of step 6-4, on the other hand, the D-Shape has its boundary representation modified so that the D-Shape has the appearance of the combination of solid shape 202, 203 and 204 as shown in FIG. 3B.

Figure 4B:
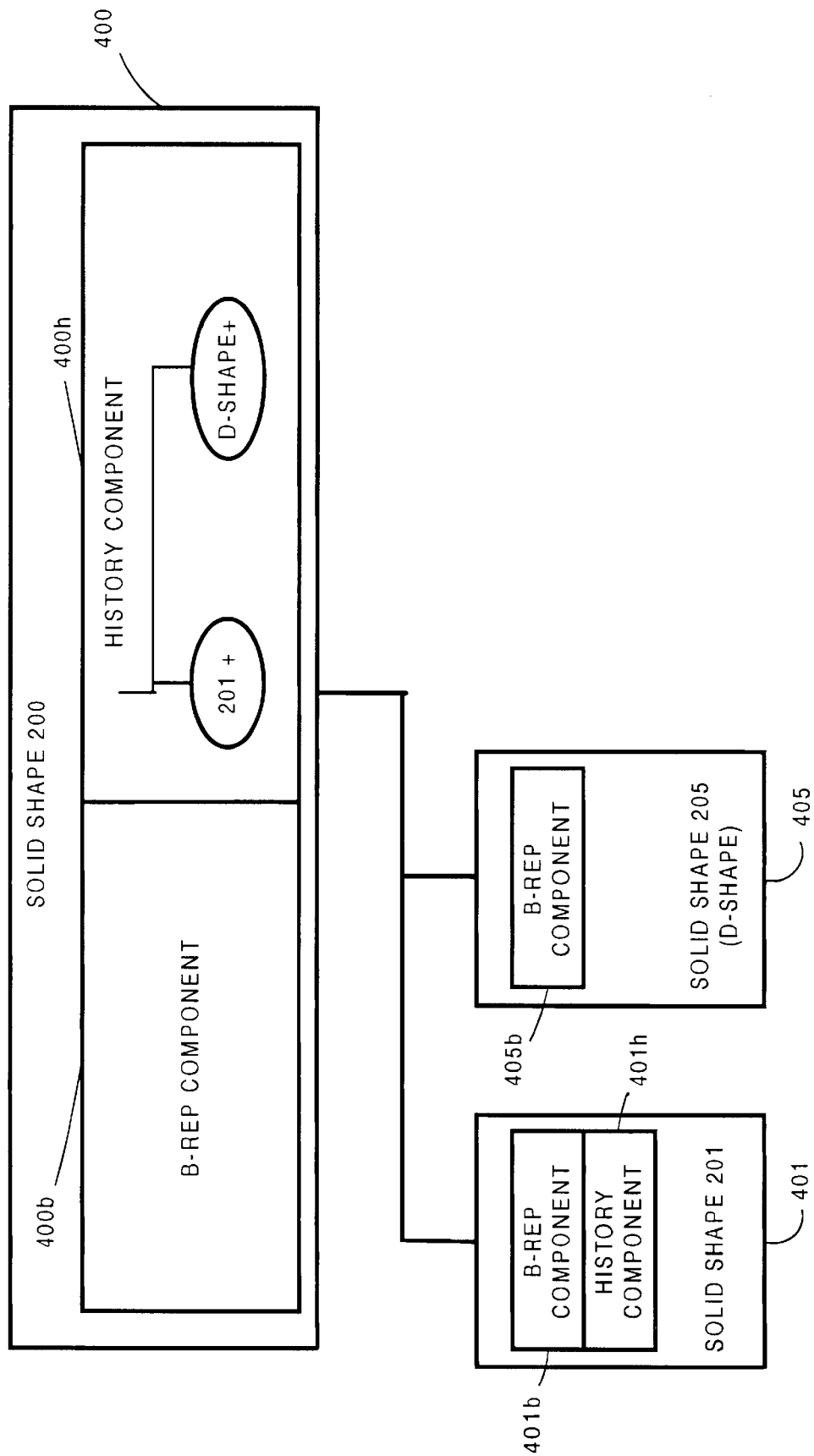
FIG. 4B is a diagrammatic view of a CSG tree for the solid part of FIG. 3B.

After the boundary representation of the modified D-Shape has been generated by the topology-changeable local operation of step 6-4, at step 6-5 the driver 522 makes a function call to modify the history/creation component 400h of solid shape COM object 400 for solid shape 200 to reflect conversion of solid shapes 202, 203, and 204 to a new D-Shape 205. Among other things, FIG. 4B reflects the results of the function call of step 6-5. As seen in FIG. 4B, the history/creation component 400h of solid shape 400 now has only the solid shape 201 and the D-Shape 205.

At step 6-6, driver 522 implements insertion of D-Shape 205 with its boundary representation component 405b into the CSG tree in the manner also shown in FIG. 4B. Such insertion of the COM object 405 for D-Shape 205 is accomplished by function calls across the COM Interface 502. As a result of the insertion of D-Shape 205 at step 6-6, the CSG tree now has only solid shape 200 and solid shape 201 (with their respective COM objects 400 and 401), along with D-Shape 205 (and its COM object 405). Noticeably, the COM object 405 for D-Shape 205 has a boundary representation component 405b (generated at step 6-4), but no history/creation component.

After the CSG tree has been modified in the manner of step 6-6, at step 6-7 the driver 522 causes engine 512 to re-evaluate a subset of the CSG tree in order to drive the display 158 to obtain the image depicted in FIG. 3B. Techniques and procedures for re-evaluation of CSG trees generally are well known in the art. In a preferred embodiment of the invention, a "smart update" re-evaluation technique, described infra, is utilized for step 6-7.

Thus, after driver 522 has executed the basic steps shown in FIG. 6, the solid shapes 202, 203, and 204 of FIG. 3A are converted into a D-Shape 205 which has the desired appearance, i.e., the appearance shown in FIG. 3B. It is important to note that the procedure for converting a feature-based representation of a solid shape or set of faces to a design face representation performs as separate (but not independent) steps the following: (1) modification of the boundary representation of the solid shape (by the topology-changeable local operation [see step 6-4]); and (2) modification of the history [see step 6-5]. Performing these operations in separate steps keeps the history of the three dimensional object consistent with a resulting boundary representation of the three dimensional object, and differs from typical feature-based processing in which a boundary representation components are re-evaluated as part of the history.

It was above mentioned in connection with step 6-2 that driver 522 decided what solid shapes are to be combined into a D-Shape for the modeling representation conversion. The processing of step 6-2 involves driver 522 analyzing a list of heuristics for determining what solid shapes are affected by the conversion from feature-based modeling to direct face modeling. The heuristics included in the list are reflected by FIG. 6A.

Figure 6A:
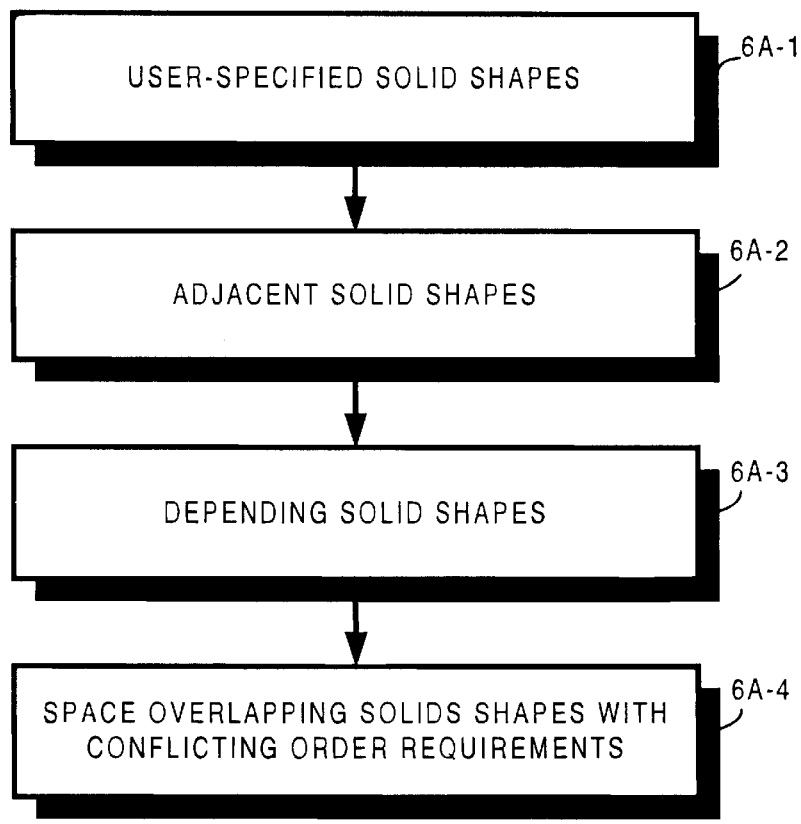
FIG. 6A is a flowchart showing basic substeps of step 6-2 of FIG. 6, and in particular reflects a list of heuristics for determining what solid shapes are affected by the conversion from feature-based modeling to direct face modeling.

FIG. 6A shows that, as part of step 6-2, driver 522 considers four basic criteria for determining what solid shapes are to be combined for conversion from feature-based modeling representation to direct face modeling representation. That is, FIG. 6A shows analyses performed by 522 in determining what solid shapes are to be combined into a D-Shape. As shown by step 6A-1, driver 522 first includes in the new D-Shape the solid shapes which are specified by the user, or which are the sources of the faces which are modified by the user using direct face modeling commands.

Next, as represented by step 6A-2, driver 522 includes any relevant adjacent solid shapes. That is, at step 6A-2 driver 522 includes any solid shapes which are sources of faces or surfaces which are adjacent to the faces or surfaces which the user is attempting to modify. Exceptions to step 6A-2 are (1) blend/chamfer shapes (since driver 522 endeavors to preserve the blend/chamfer shapes as much as possible), and (2) adjacent faces that do not affect the topology-changeable local operation (see step 6-4).

Figure 11:
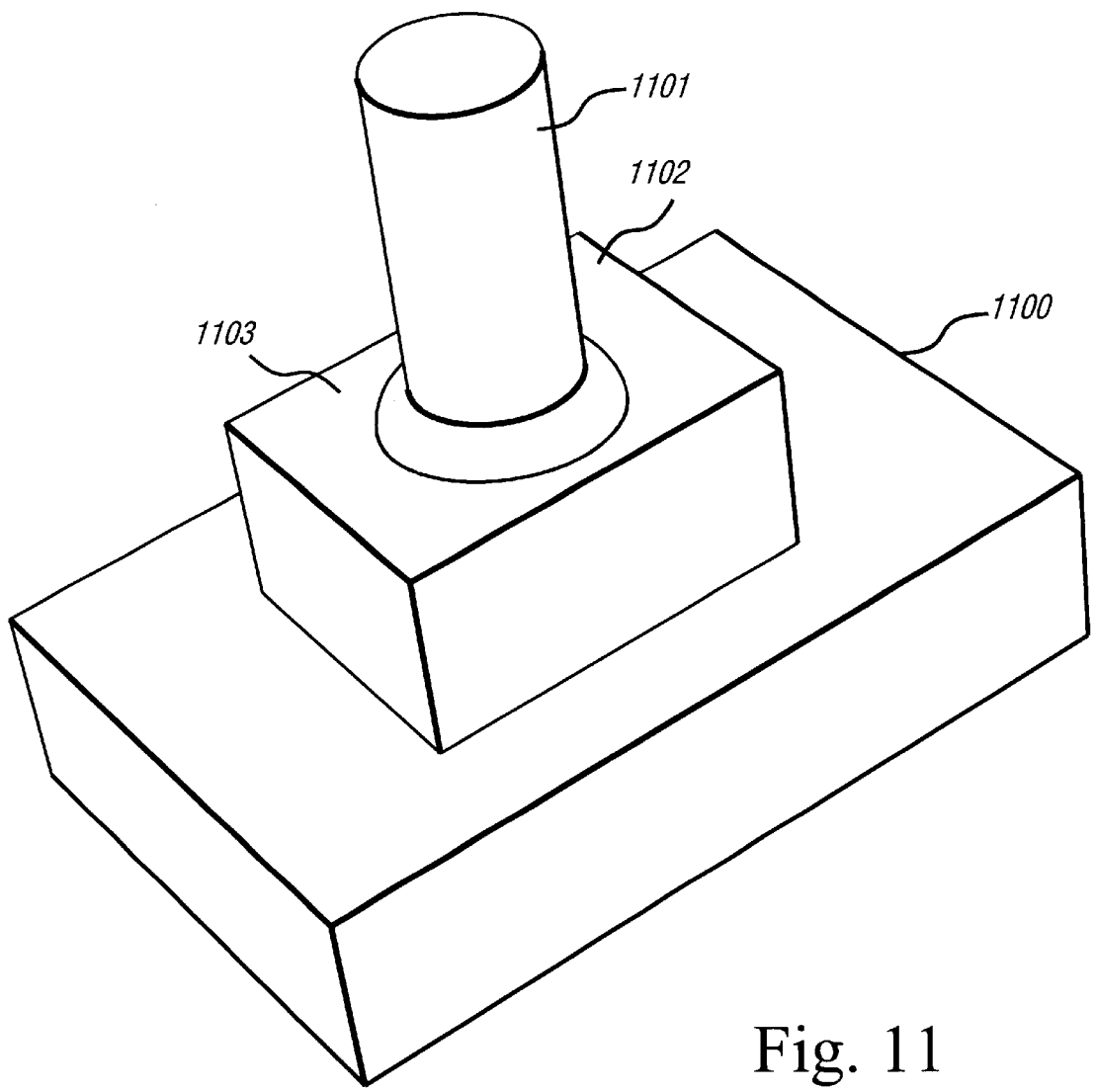
FIG. 11 is a diagrammatic view showing two "depending" solid shapes that are combinable into a D-Shape.
Figure 11A:
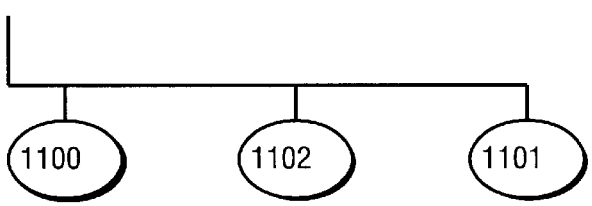
FIG. 11A is a diagrammatic view showing a history of a solid shape assembly of FIG. 11.

At step 6A-3 driver 522 includes in the D-Shape any "depending" solid shapes. A "depending solid shape" is a solid shape that is involved in the data structure definition of any other solid shapes that are already determined to be included in the D-Shape (i.e., any other solid shapes that are to be converted to direct face modeling representation in connection with this particular operation). An example of step 6A-3 is illustrated in FIG. 11. In particular, FIG. 11 shows a solid shape 1100 upon which two solid shapes 1101 and 1102 are mounted. The solid shape 1101 has an intersection-blend option (shown at 1103), and joins solid shape 1102 by a Boolean operation. Blends are created on the intersection edges between solid shape 1101 and solid shape 1102. Since the intersection blends depend on the intersection edges, it can be seen that solid shape 1101 "depends" on solid shape 1102. If solid shape 1101 is to be converted into a D-Shape, then in accordance with step 6A-3 the solid shape 1102 must also be converted into the same D-Shape. FIG. 11A shows the history component for the solid shape assembly of FIG. 11.

Figure 12:
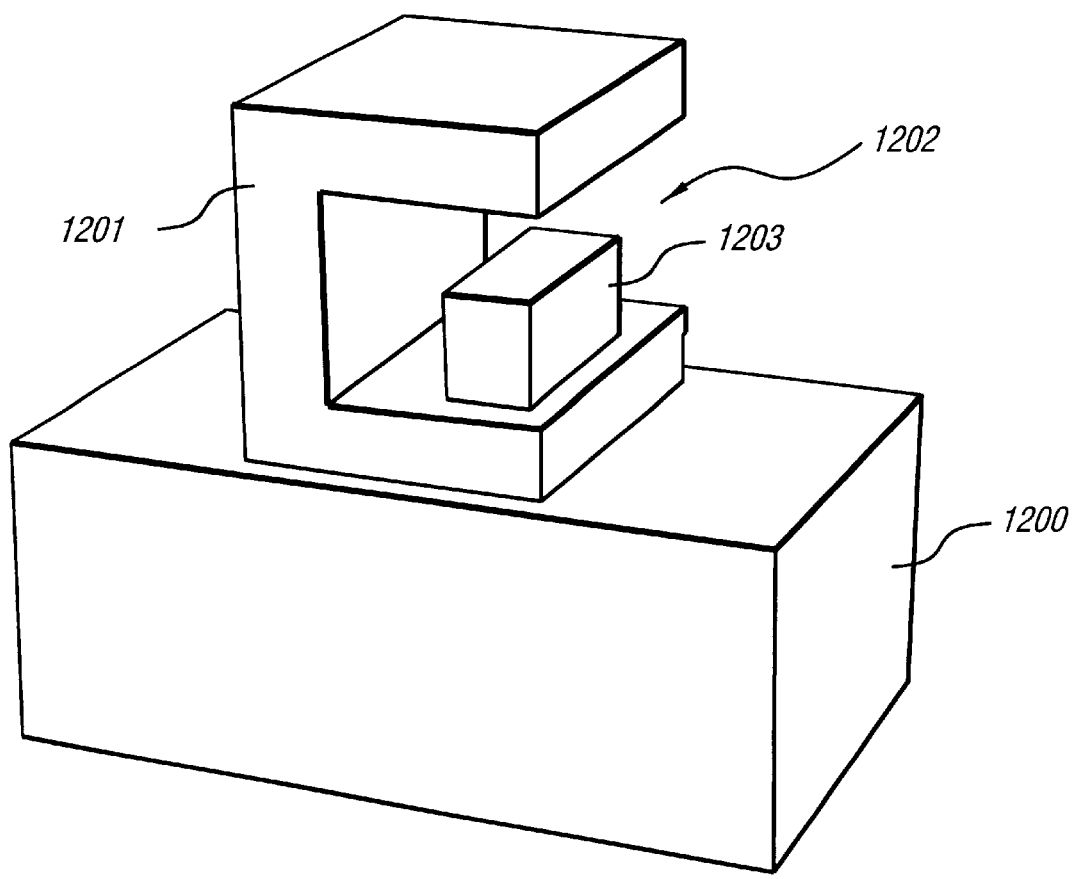
FIG. 12 is a diagrammatic view showing overlapping solid shapes having conflicting ordering requirements.
Figure 12A:
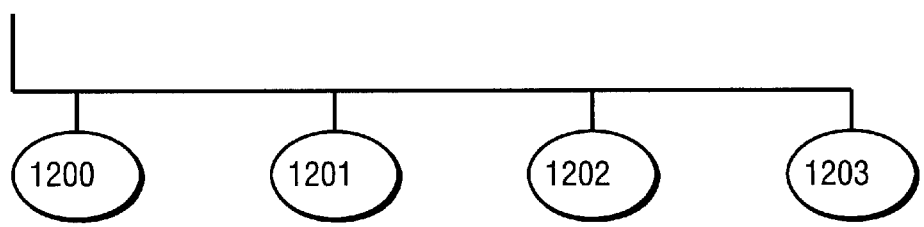
FIG. 12A is a diagrammatic view showing a history of a solid shape assembly of FIG. 12.

Lastly, at step 6A-4 driver 522 includes in the D-Shape any solid shapes that overlap in space and having conflicting ordering requirements. In other words, any solid shapes that need apply before and after a D-Shape during evaluation must also be combined in and converted as part of the D-Shape. Here "apply" means combining the topology and geometry of a solid shape to the solid shape by Boolean operation. Once such example is illustrated in FIG. 12 wherein solid shape 1201 is an adding material solid shape and solid shape 1202 is a subtracting material shape, and has been applied after solid shape 1201 and cuts away some material from solid shape 1201. The solid shape 1203 is an adding material shape, and has been applied after solid shape 1202 and adds some material at the location where solid shape 1202 was cutting. Since the Boolean operation is order dependent, the relative order of 1201, 1202, and 1203 in the history/creation component must be maintained (see FIG. 12A), otherwise the resulting boundary representation body will be different. Consequently, if solid shape 1201 and solid shape 1203 are to be converted into a single D-Shape, then solid shape 1202 cannot be both after and before the same D-Shape. Therefore, in accordance with step 6A-4, the solid shape 1202 must be converted into the same D-Shape.

The heuristic list of criteria depicted by FIG. 6A thus provides examples of how driver 522 fulfills its responsibility at step 6-2 of determining what solid shapes are to be combined and converted into a D-Shape. As understood from the foregoing, the particular solid shapes which are combined into the D-Shape and converted are not just those which are specified by the user or involved in a user modification. Rather, driver 522 checks further to determine, in accordance with the criteria of FIG. 6A, whether other solid shapes are affected by the request/modification and therefore necessarily must be combined into the D-Shape.

Reference was made above in connection with step 6-4 to a topology-changeable local operation. The topology-changeable local operation is a procedure for modifying a boundary representation component for a solid shape which changes not only the original geometry information of the component, but which also changes the topology information of the component. This is in contrast to most prior art boundary representation modification procedures, which affect only geometry information (e.g., a point on a face and the direction of a face).

FIG. 7A and FIG. 7B illustrate example principles involved in the topology-changeable local operation of step 6-4. Consideration begins first with the solid shape 700A illustrated in FIG. 7A along with its topology tree 710A. Then, as solid shape 700A is modified in the manner of FIG. 7B to result in solid shape 700B, its resultant topology tree 710B is contrasted with the earlier topology tree 710A.

The topology tree 710A of FIG. 7A for solid shape 700A includes tiers for a body, a lump, a shell (connected faces), and the seven faces of solid shape 700A. Here "body" is a solid object that consists of single or multiple disjointed "lumps". A "lump" is a single piece of solid material. A "shell" is a collection of connected boundary faces of a "lump". In this regard, it can be seen in FIG. 7A that solid shape 700A has seven faces, numbered as 711A–717A, respectively. Of these seven faces, six faces (711–716) are faces of the cube; the seventh face (717) is the face formed by the cylindrical hole formed in the cube. Although not shown in FIG. 7A, the boundary representation of solid shape 700A also includes geometric information regarding each face. For example, geometry information for face 711 would indicate that the face has two loops, one of the loops (the perimeter of the top of the cube) having four edges and the other of the loops being a circle (formed by the intersection of face 711 with face 717).

FIG. 7A also shows an arrow 720. Arrow 720 depicts a desired modification of solid shape 700A, the modification being moving face 713 from the position shown in FIG. 7A to a parallel position shown by plane 730. Plane 730, shown in dot-dashed lines, centrally cuts the cubical body of solid shape 700A through the cylindrical hole bounded by surface 717.

If the move of face 713 as indicated by arrow 720 in FIG. 7A is a successful direct face modeling move, the result is as shown in FIG. 7B. The resultant solid shape 700B shown in FIG. 7B now has eight rather than seven faces. Using same face numbering as in FIG. 7A where appropriate, the eight faces of the solid shape 700B of FIG. 7B include the six faces 711–712 and 714–717, and in addition two new faces 713(1) and 713(2) formed from former face 713. In accordance with the topology changeable local operation of the present invention as implemented in step 6-4, the topology tree in the boundary representation is changed to reflect the fact that there are now eight faces rather than seven. In this regard, the topology tree for the modified solid shape 700B is shown in FIG. 7B as including eight faces. As mentioned in connection with the topology tree of FIG. 7A, for each of the eight faces of the tree of FIG. 7B geometric information is also provided in the boundary representation component. In this regard, for example, face 711 of solid shape 700B there is now only one closed loop.

Figure 7C:
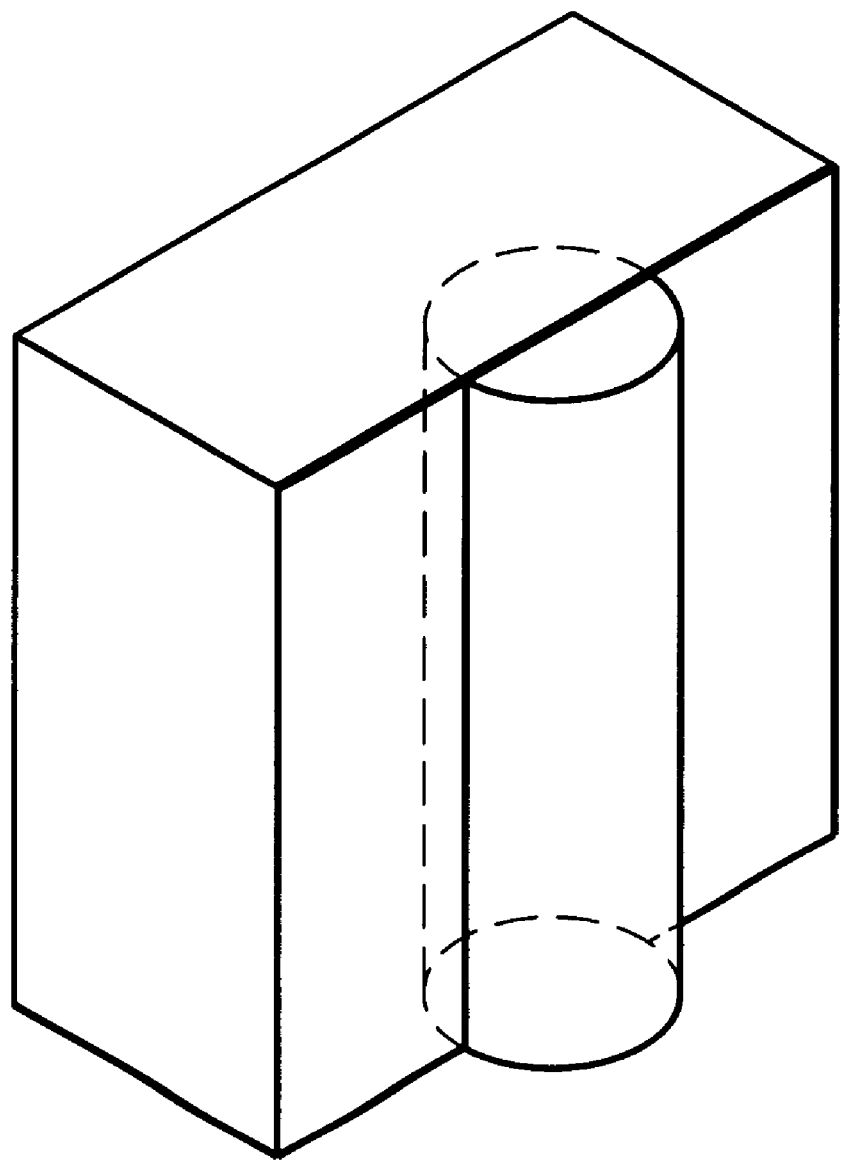
FIG. 7C is a partial isometric, partial diagrammatic view showing an invalid model which may be created from direct face modification if topology-changeable local operation is not available.

Thus, the topology-changeable local operation of step 6-4 of program 500 as implemented by driver 522 modifies not only geometric information regarding the faces of a solid shape undergoing modification, but also modifies the topology information as above illustrated with reference to the examples of FIG. 7A and FIG. 7B. Without the topology-changeable local operation capability, a direct face move in this example will produce an invalid model as illustrated in FIG. 7C. The invalid model of FIG. 7C does not detect the intersection between the block and the cylinder.

Step 6-7 of the program 500 involved driver 522 initiating re-evaluation of the history/creation components of the CSG tree for solid shape in order to obtain the image on display 158 as depicted in FIG. 3B. At this juncture, the CSG tree for solid shape 200 is as depicted in FIG. 4B. The re-evaluation of the history/creation components of CSG tree can involve a complete re-evaluation of the entire CSG tree, i.e., performing all Boolean operations in the history/creation component in seriatim. However, in a preferred mode of the invention, only a portion of the CSG tree is re-evaluated whenever possible. In this regard, when possible the program 500 of the present invention incorporates a "smart update" feature in connection with the re-evaluation of step 6-7.

In the smart update feature of program 500, Boolean operations are not performed one by one for all solid shapes included in the CSG tree. Rather, in essence, the smart update feature of the present invention endeavors to "heal" those solid shapes which have been modified, without disturbing the unmodified solid shapes. This "healing" is accomplished by a special function called by driver 522.

Figure 8A:
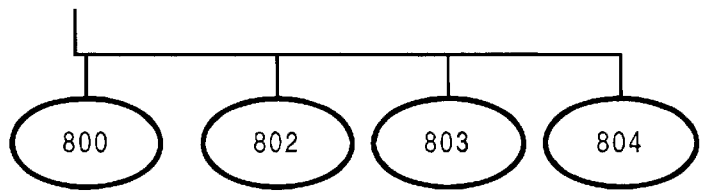
FIG. 8A–FIG. 8C are diagrammatic views over time of a history/creation component of a solid shape and illustrating a smart update feature implemented by the program of FIG. 5.
Figure 8B:
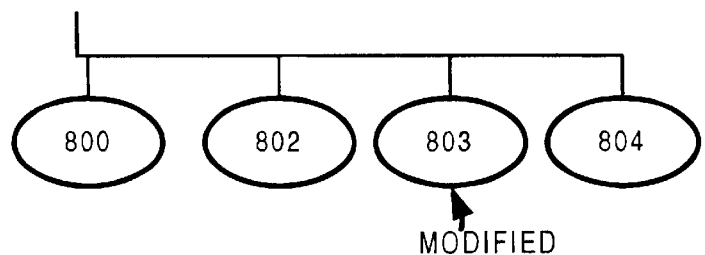
Figure 8C:
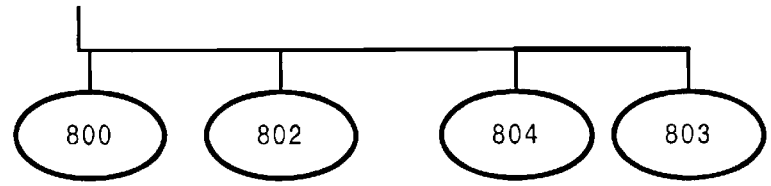

The operation of the smart update feature is illustrated with reference to FIG. 8A through FIG. 8C. FIG. 8A shows a history/creation component which shows an original order of creation of solid shapes 801 through 804. FIG. 8B shows the same history/creation component as FIG. 8A, but reflects the fact that solid shape 803 has been modified. Suppose, for example, that solid shape 803 is a cutting shape that subtracts material in a Boolean operation from an earlier solid shape. In accordance with the smart update feature of the present invention as shown in FIG. 8C, the modified solid shape 803 is first deleted from the history/creation component, healed, and then added at the chronological end of the history/creation component, i.e., in an order after solid shape 804. As a consequence of the smart update feature, only a portion of the history/creation component, in this case shape 803, need now be evaluated, thereby saving time. Thus, the smart update feature of the invention encompasses a history reordering based on predictability and performance, a "healing" of the boundary representation model; and a partial history re-evaluation.

Figure 9:
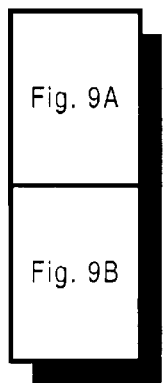
FIG. 9 is a diagrammatic view depicting the relation of FIG. 9A and FIG. 9B.
Figure 9A:
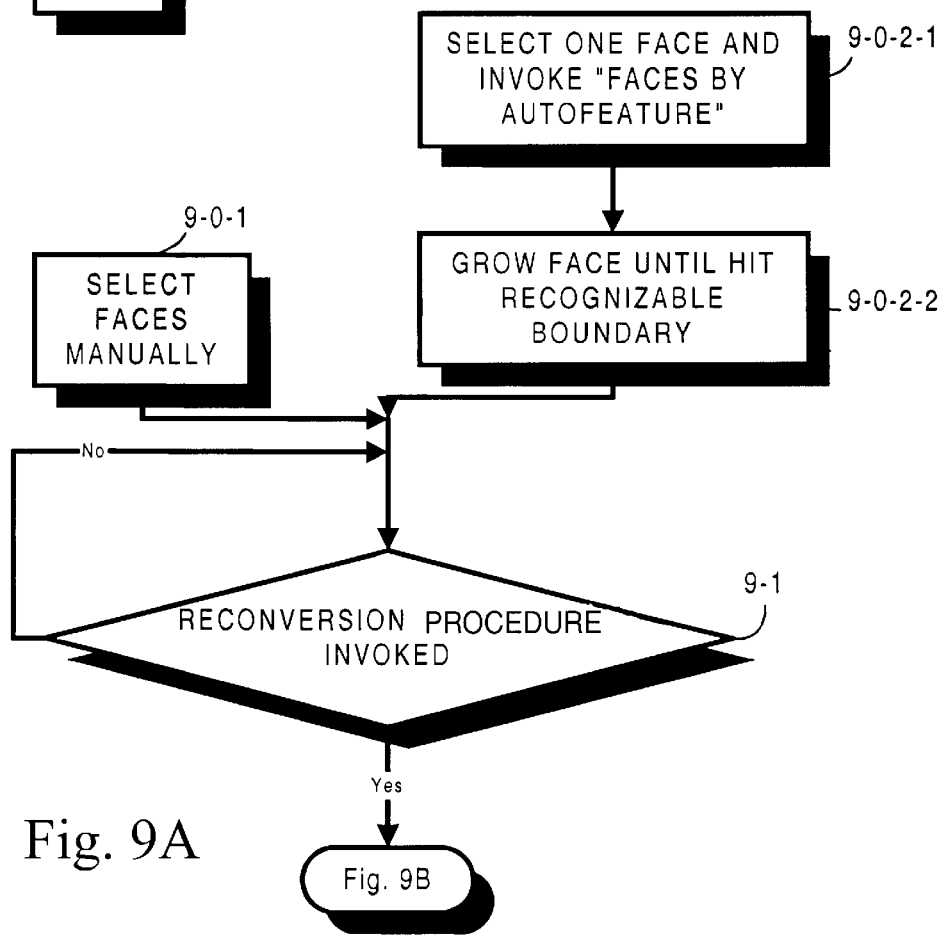
FIG. 9A and FIG. 9B are flowcharts showing basic steps performed by a driver included in the computer program illustrated in FIG. 5 in connection with a procedure for reconversion of a D-Shape to a feature-based representation.
Figure 9B:
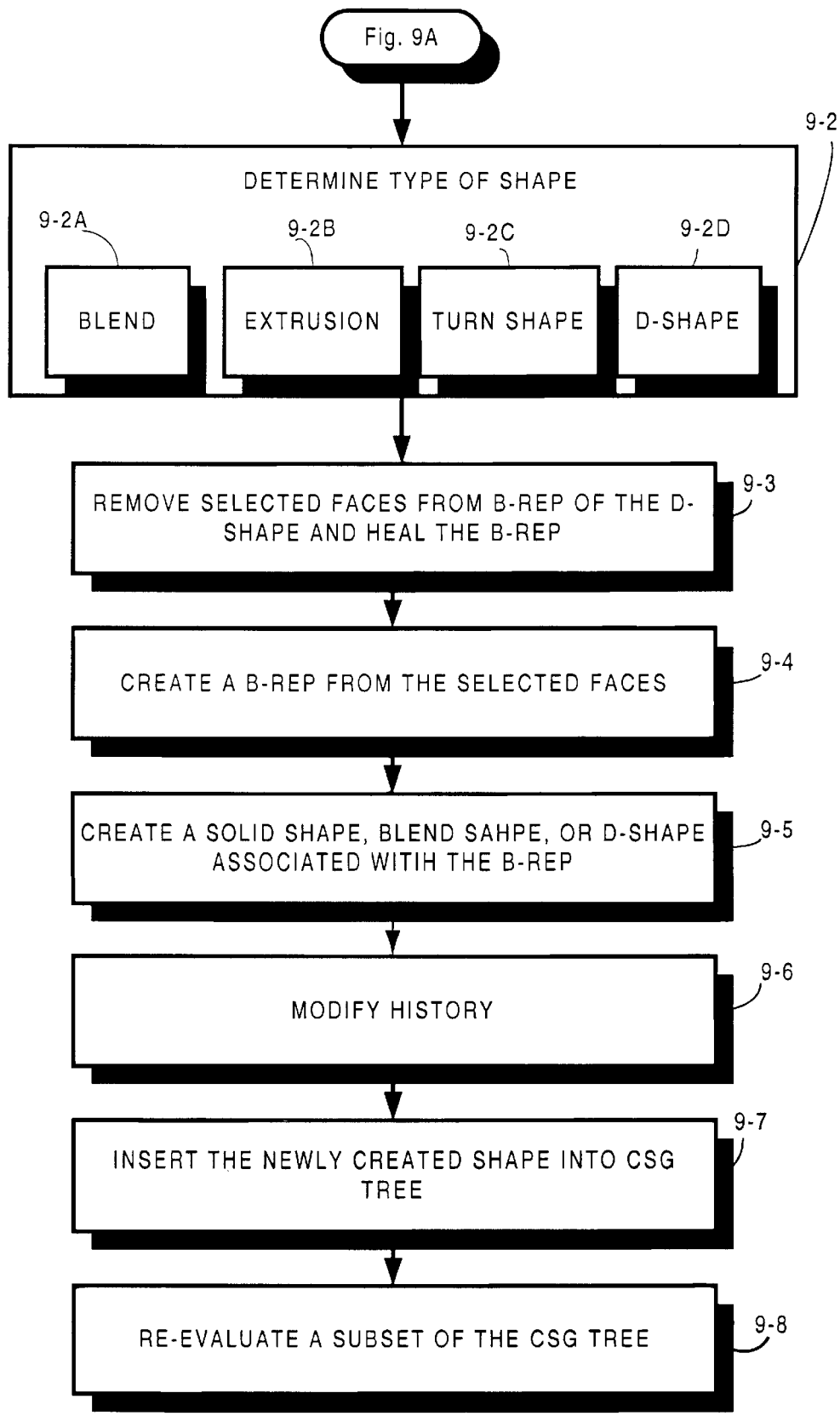
Figure 14A:
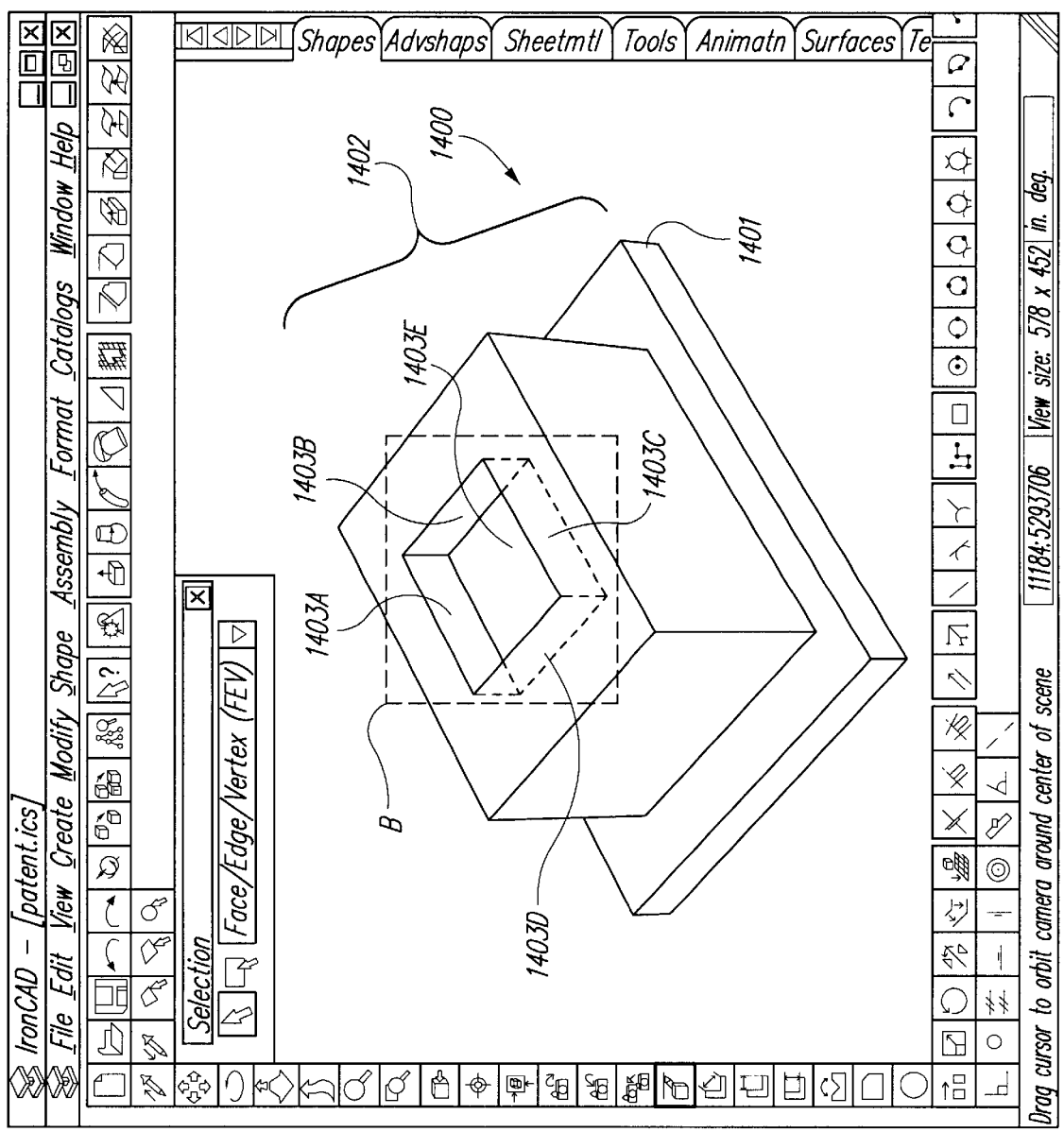
FIG. 14A is a diagrammatic view of a screen showing manual selection of a face of a solid shape in connection with a reconversion procedure of the program of FIG. 5.

The program 500 of the present invention also permits the reconversion of a D-Shape to a feature-based solid shape(s). Basic steps involved in the reconversion procedure of program 500 are illustrated in FIG. 9A and FIG. 9B. In order to implement the reconversion procedure of program 500, the user first selects a subset of faces of a solid shape. The faces selection can be accomplished in either of two modes: (1) manually (accomplished by picking individual faces as illustrated in FIG. 14A), or (2) using an auto-feature selection (illustrated in FIG. 14B). FIG. 9A shows steps involved with both face selection modes of the reconversion procedure of program 500.

Figure 14B:
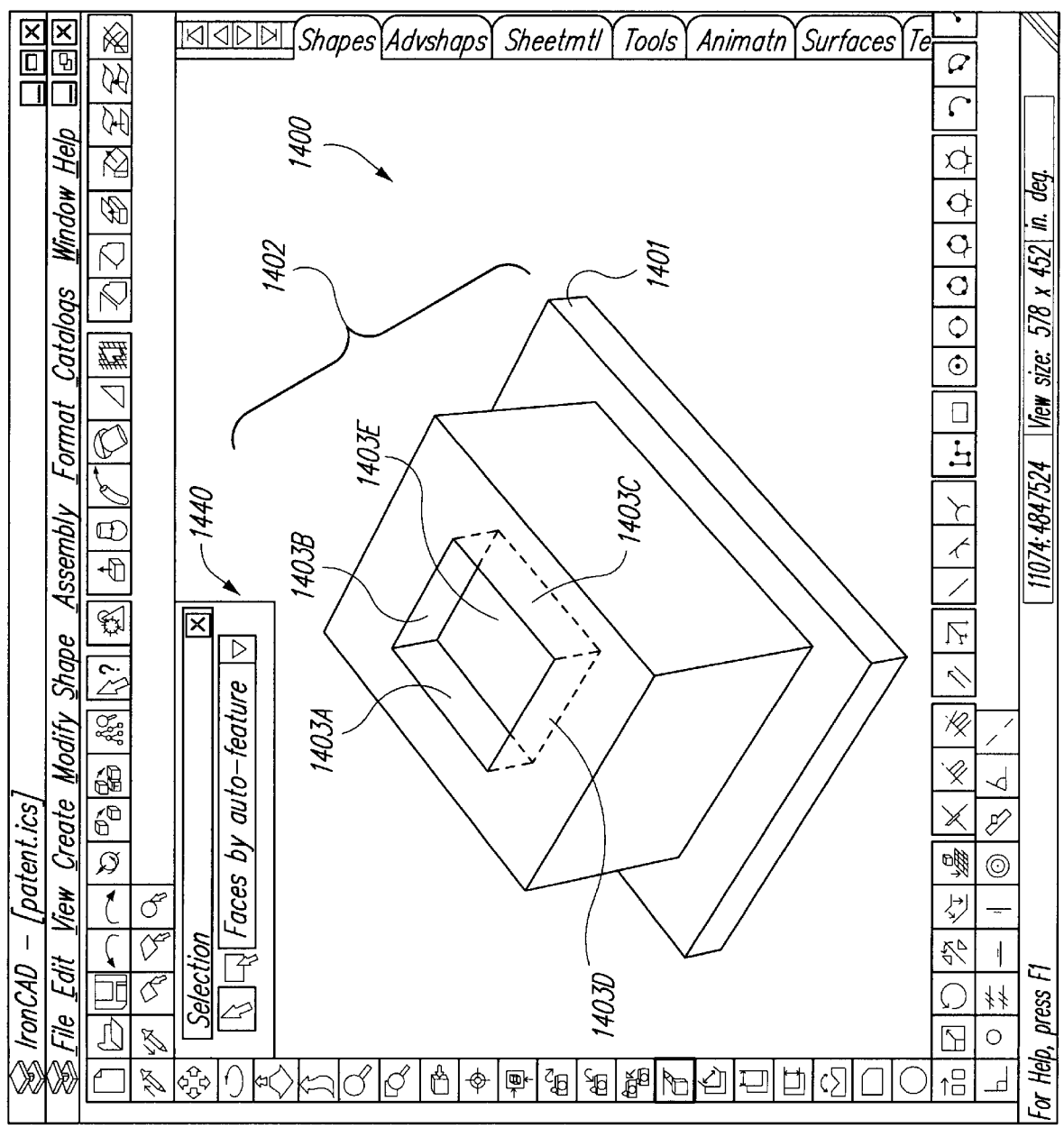
FIG. 14B is a diagrammatic view of a screen showing selection by auto-feature of a face of a solid shape in connection with a reconversion procedure of the program of FIG. 5.
Figure 14C:
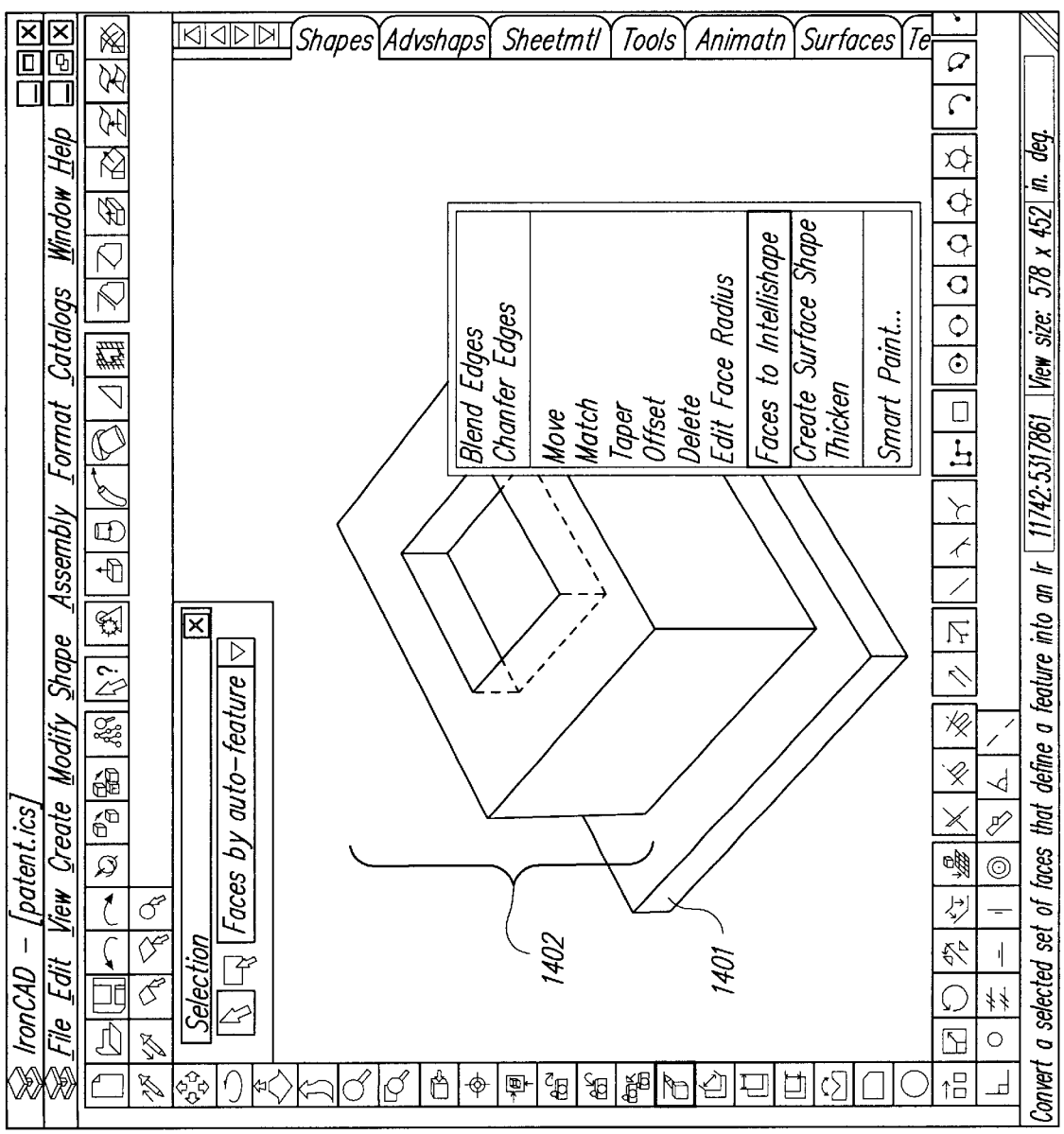
FIG. 14C is a diagrammatic view of a screen showing initiating of the reconversion procedure of the program of FIG. 5 by selecting a "convert to IntelliShape" option.
Figure 15A:
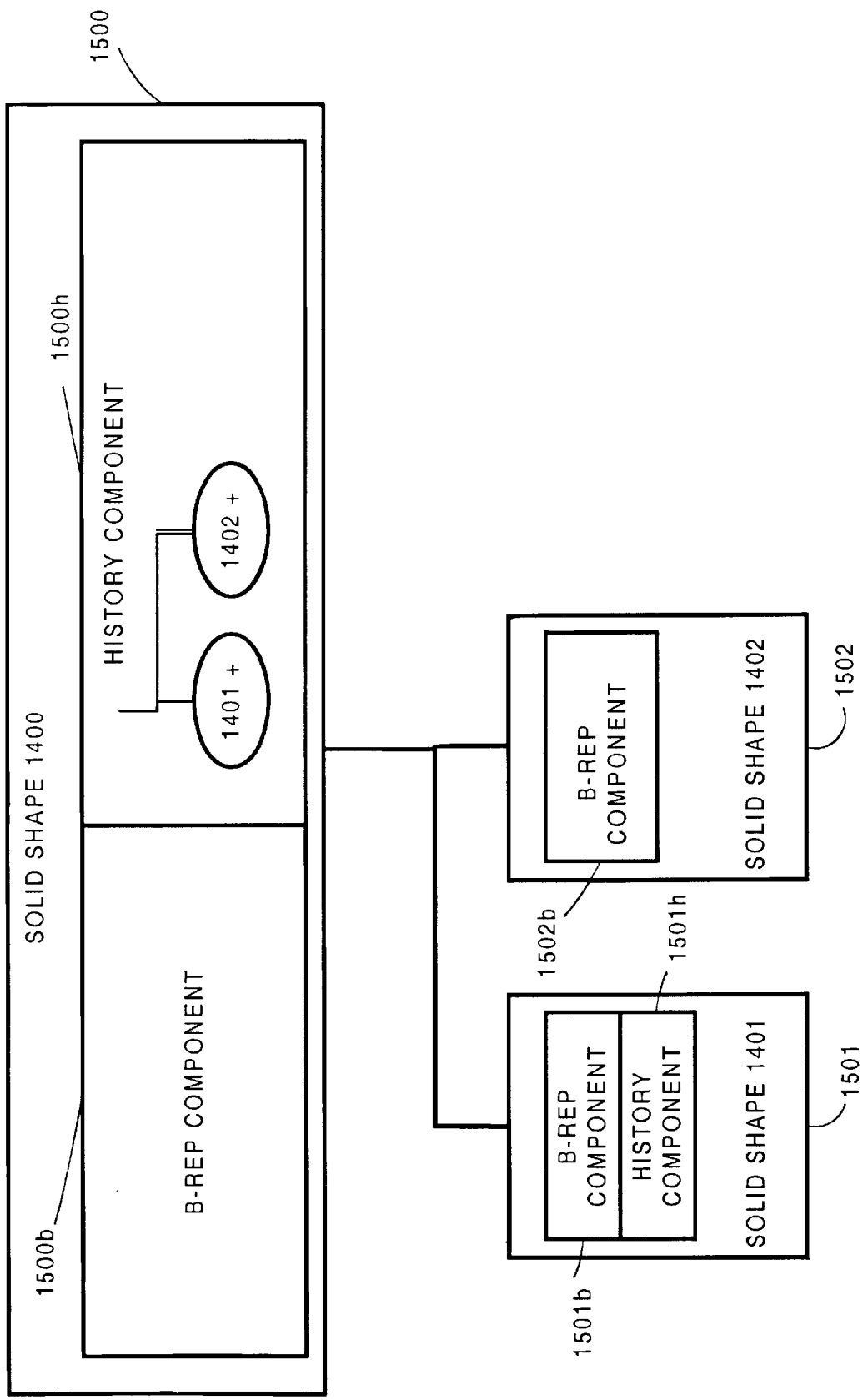
FIG. 15A–FIG. 15F are diagrammatic views showing changes in an CSG tree for the solid shapes depicted in FIGS. 14A–14C in connection with the reconversion procedure of the program of FIG. 5.
Figure 15B:
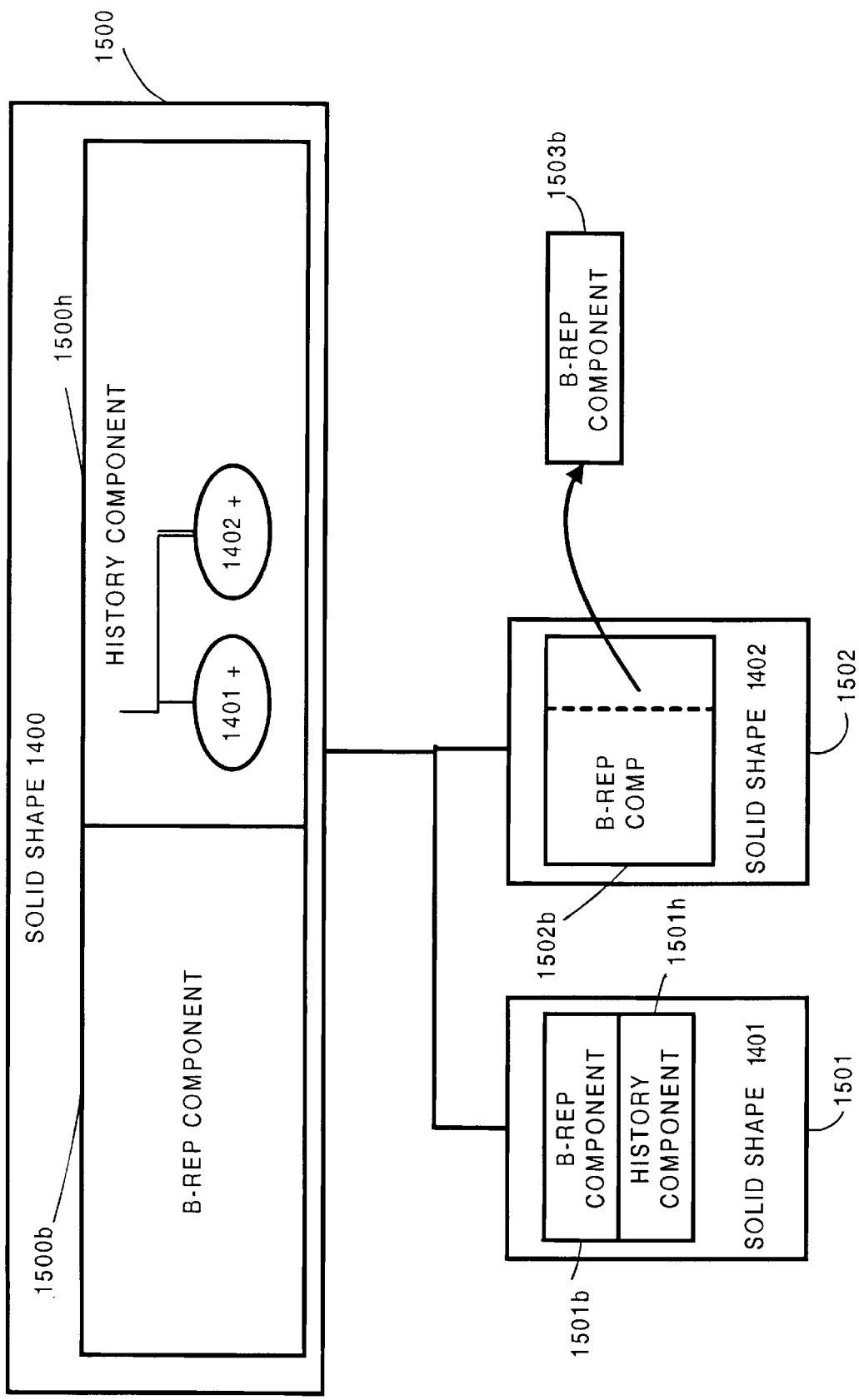
Figure 15C:
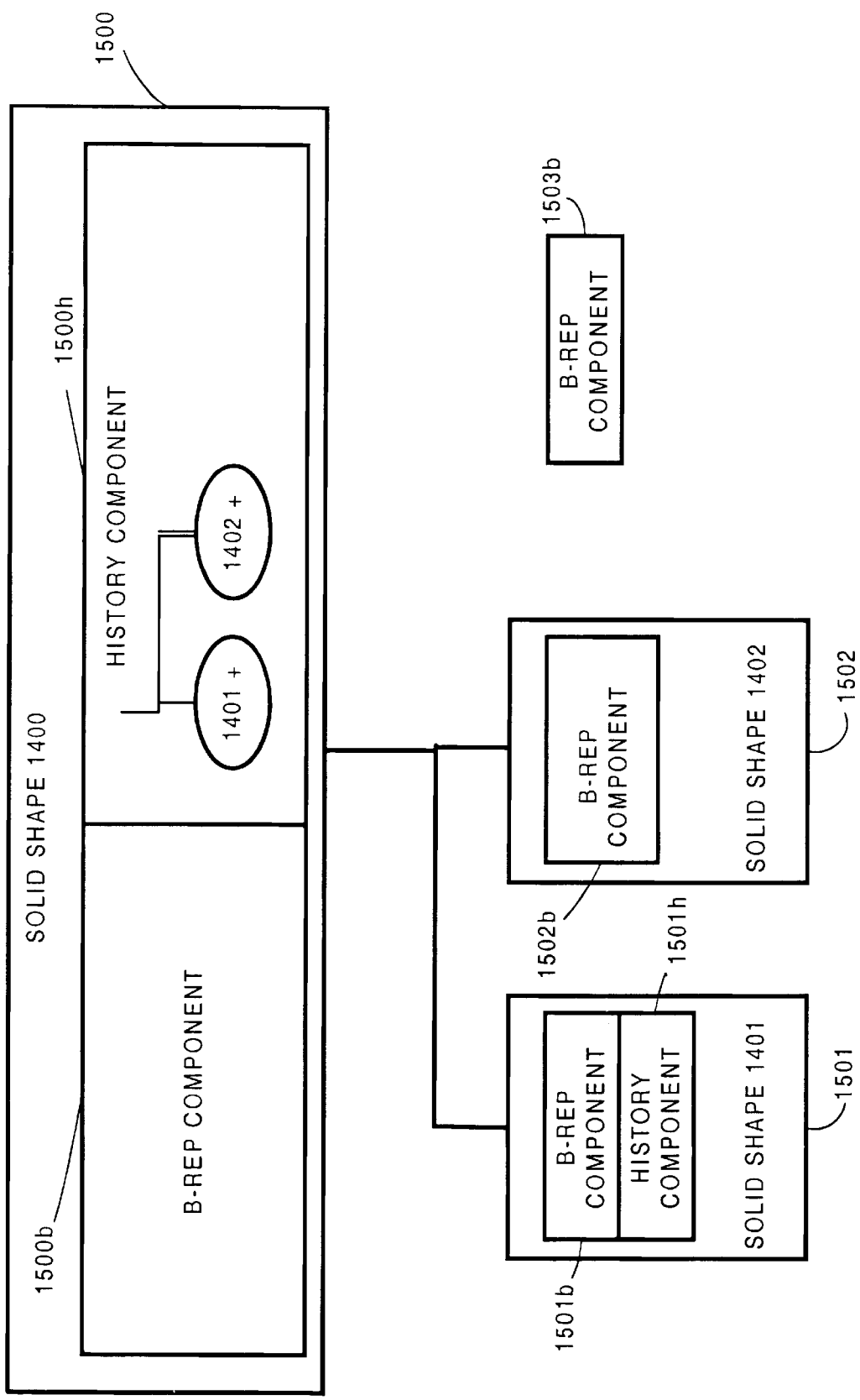

The reconversion procedure of program 500 is hereinafter described with reference to FIGS. 14A–14C, which features a compound solid shape 1400 comprised of feature-based solid shape 1401 and D-shape solid shape 1402. Solid shape 1401 is a thin flat rectangular solid slab; D-shape 1402 (shown as shaded in FIG. 14A and FIG. 14B) comprises two rectangular solid boxes, with an upper box mounted on a lower box. The corresponding initial CSG tree for compound solid shape 1400 is shown in FIG. 15A, which shows objects 1500, 1501, and 1502 for solid shapes 1400, 1401, and 1402, respectively. The history component 1500h for solid shape 1400 shows that solid shape was formed by solid shapes 1401 and 1402. Since solid shape 1402 is a D-Shape, it has no history component. As shown in FIG. 14A and FIG. 14B, the D-Shape 1402 is formed of two solid rectangular boxes, an upper of the two solid rectangular boxes comprising D-Shape 1402 having faces 1403A–1403E. In the illustration of FIGS. 14A–14C and FIG. 15A–FIG. 15F, the user desires to change the upper of the two solid rectangles comprising D-Shape 1402 to a feature-based intellishape using the reconversion procedure of program 500.

The manual face selection mode is depicted by step 9-0-1 in FIG. 9A and is illustrated by FIG. 14A. In the manual face selection mode, the user can either select (e.g., mouse click on) each of faces 1403A–1403E one-by-one, or can use a selection box B as shown in FIG. 14A which envelopes the faces 1403A–1403E. Upon selection, program 500 understands that the selected faces are to be transformed into a feature-based solid shape.

The auto-feature selection mode is depicted by step 9-0-2-1 and step 9-0-2-2 in FIG. 9A and is illustrated by FIG. 14B. In the auto-feature selection mode, the user activates a "faces by auto-feature" button (resulting in display of the tool bar 1440 shown in FIG. 14B). In the auto-feature selection mode, the user need click on only one of the faces 1403A–1403E, as represented by step 9-0-2-1 in FIG. 9A. Then, in view of the previous activation of the "faces by auto-feature" button, at step 9-0-2-2 the program 500 grows the face until a recognizable boundary is hit. In other words, in FIG. 14B the hit face is grown until all of faces 1403A–1403E are encompassed.

After a subset of faces of a solid shape has been selected by either the manual or auto-feature selection modes, the user can initiate the recoversion procedure by selecting a "Faces to IntelliShape" option from a menu as illustrated in FIG. 14C. The foregoing operations are subsumed in step 9-1 of FIG. 9 which determines if the reconversion procedure has been invoked.

After the reconversion procedure of program 500 has been invoked, at step 9-2 the program discerns type of shape selected. The type of shape selected can be any one of a blend (as depicted by step 9-2A); an extrusion (step 9-2B); a turn shape (step 9-2C); or a D-Shape (step 9-2D). A blend is a shape that makes a sharp edge becoming a smooth round. An extrusion is a recognizable two dimensional shape (e.g., circle or polygon) which has been linearly displaced or "extruded" through a third dimension in order to form a solid shape. A turn shape is a recognizable two dimensional shape (e.g., circle or polygon) which has been rotated about an axis (exterior to the shape) in order to form a three dimensional solid shape. A D-Shape can be formed from a subset of faces of another D-Shape. Therefore, a D-Shape can be decomposed into multiple D-Shapes.

Thus, the reconversion aspect of program 500 determines, in reconverting a D-Shape to a feature-based representation, how it would have created the feature-based solid shape. As understood from the foregoing, the feature-based solid shape resulting from the reconversion may or may not be the same way that the original feature-based solid shape was actually created.

Further operational steps of the reconversion procedure of program 500 are shown in FIG. 9B. Recall that faces 1403A–1403E of D-Shape 1402 have been selected for reconversion to a feature-based solid shape. At step 9-2, the selected faces (faces 1403A–1403E in the example of FIG. 14A–FIG. 14C) are removed from the B-rep component 1502b of object 1502 of D-Shape 1402. The B-rep component 1502b of object 1502 of D-Shape 1402 is then "healed", and a B-rep component 1503b is created from the selected faces. These operations are reflected by the CSG tree of FIG. 15B and FIG. 15C, the removal of the selected faces being particularly illustrated in FIG. 15B and the healing and establishment of B-rep component 1503b being depicted in FIG. 15C.

Figure 15D:
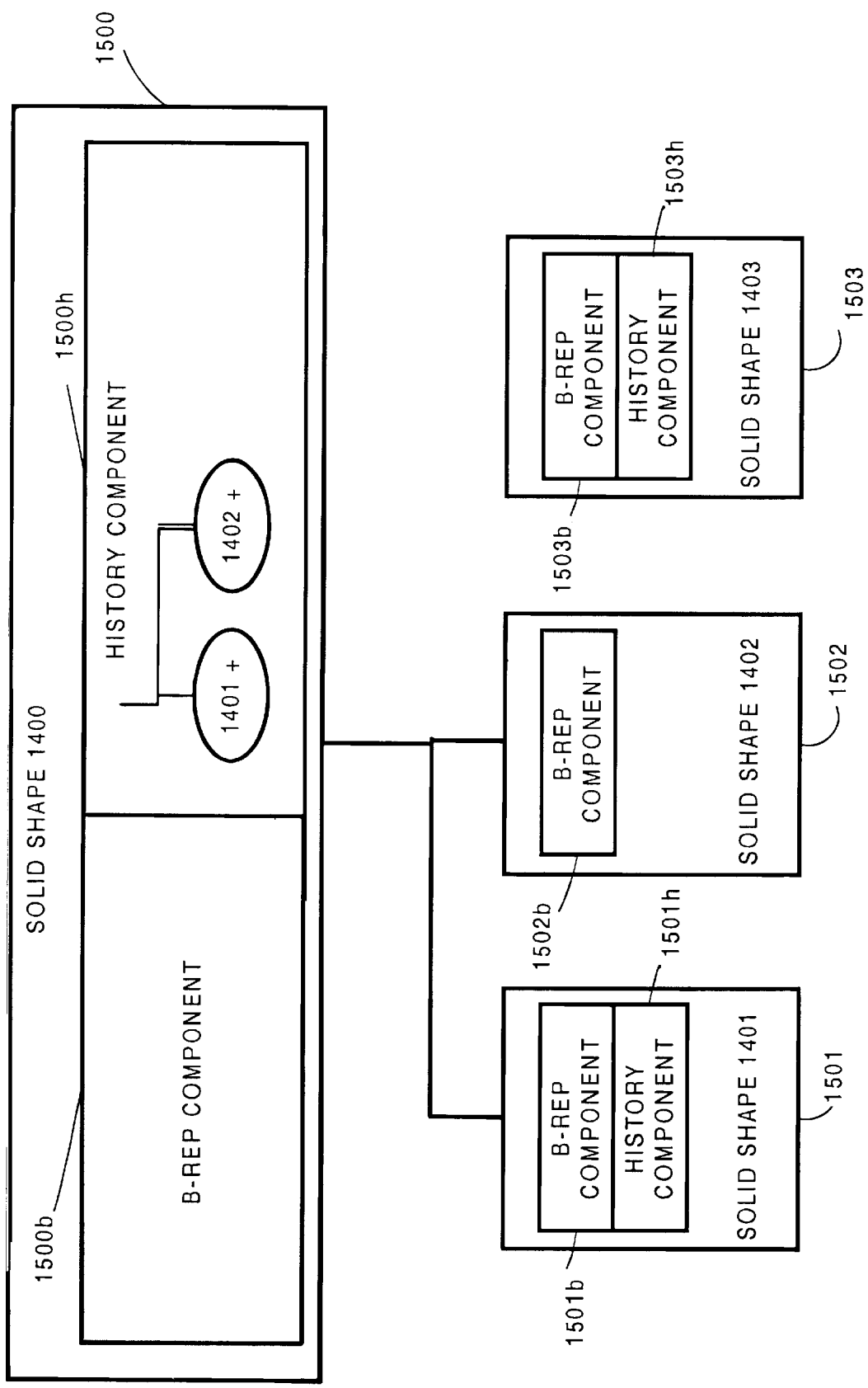

At step 9-5, and as shown in FIG. 15D, the reconversion procedure of program 500 creates a solid shape 1403, e.g., an object 1503, which is associated B-Rep 1503b of the feature-based solid shape being created. Since the new solid shape being created is a feature-based solid shape, its object 1503 has a history component 1503h as shown in FIG. 15D.

As used herein, "healing" is a patching of a solid shape to compensate for another activity, e.g., another solid shape having been carved at least partially therefrom. In the example of FIG. 14A–FIG. 14C, the creation of the new solid shape 1403 took away from D-Shape 1402 the five faces formerly included in the B-rep component for D-Shape 1402, essentially leaving the B-rep component for D-shape 1402 as incomplete or invalid. In this regard, it can be seen in FIG. 14A–FIG. 14B that removal of solid shape 1403 leaves a rectangular hole in the top surface of D-Shape 1402. Therefore, at step 9-3 the program 500 heals the D-Shape 1402 by a topology-changeable local operation of patching the incompleteness in the B-rep.

Figure 15E:
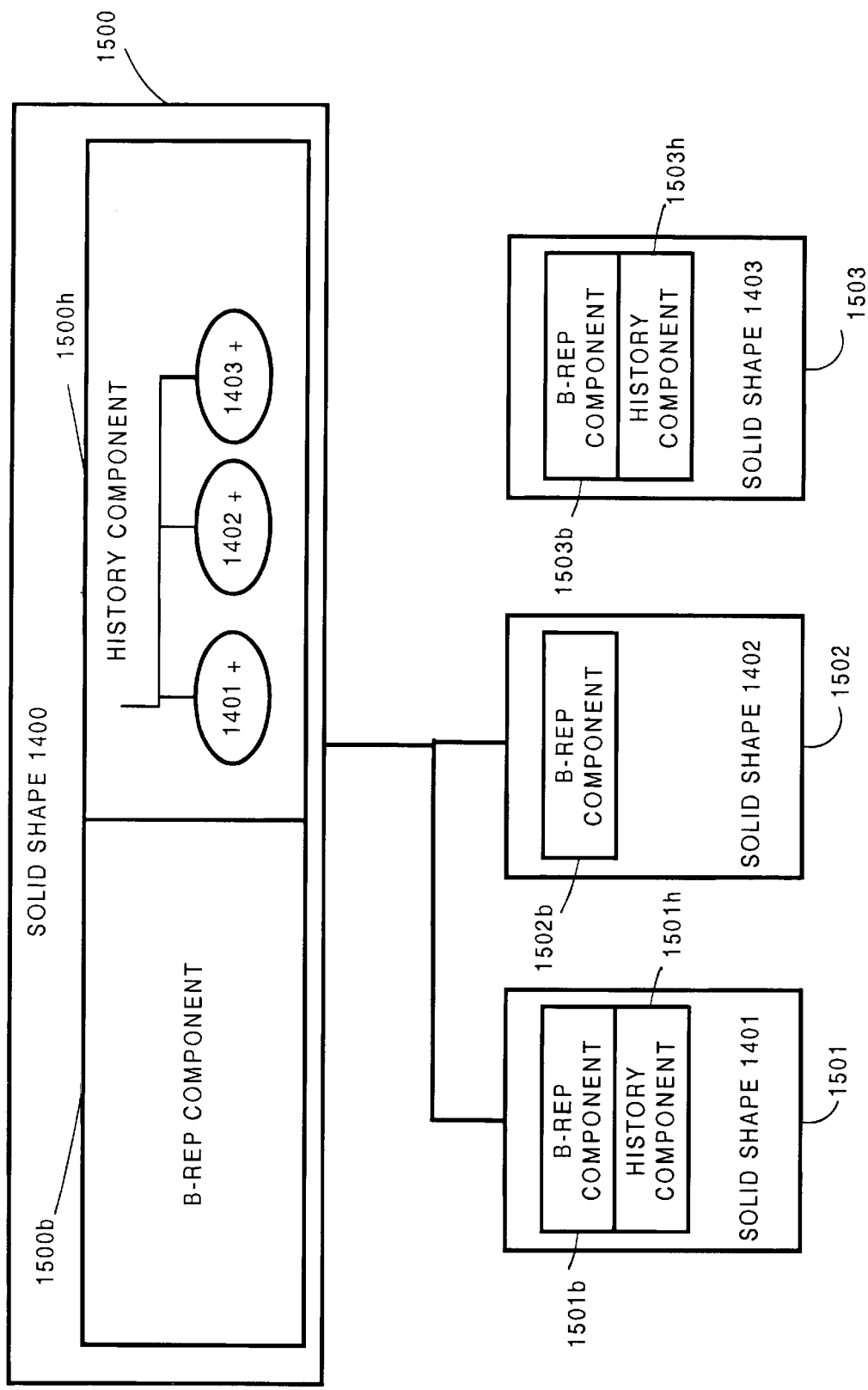
Figure 15F:
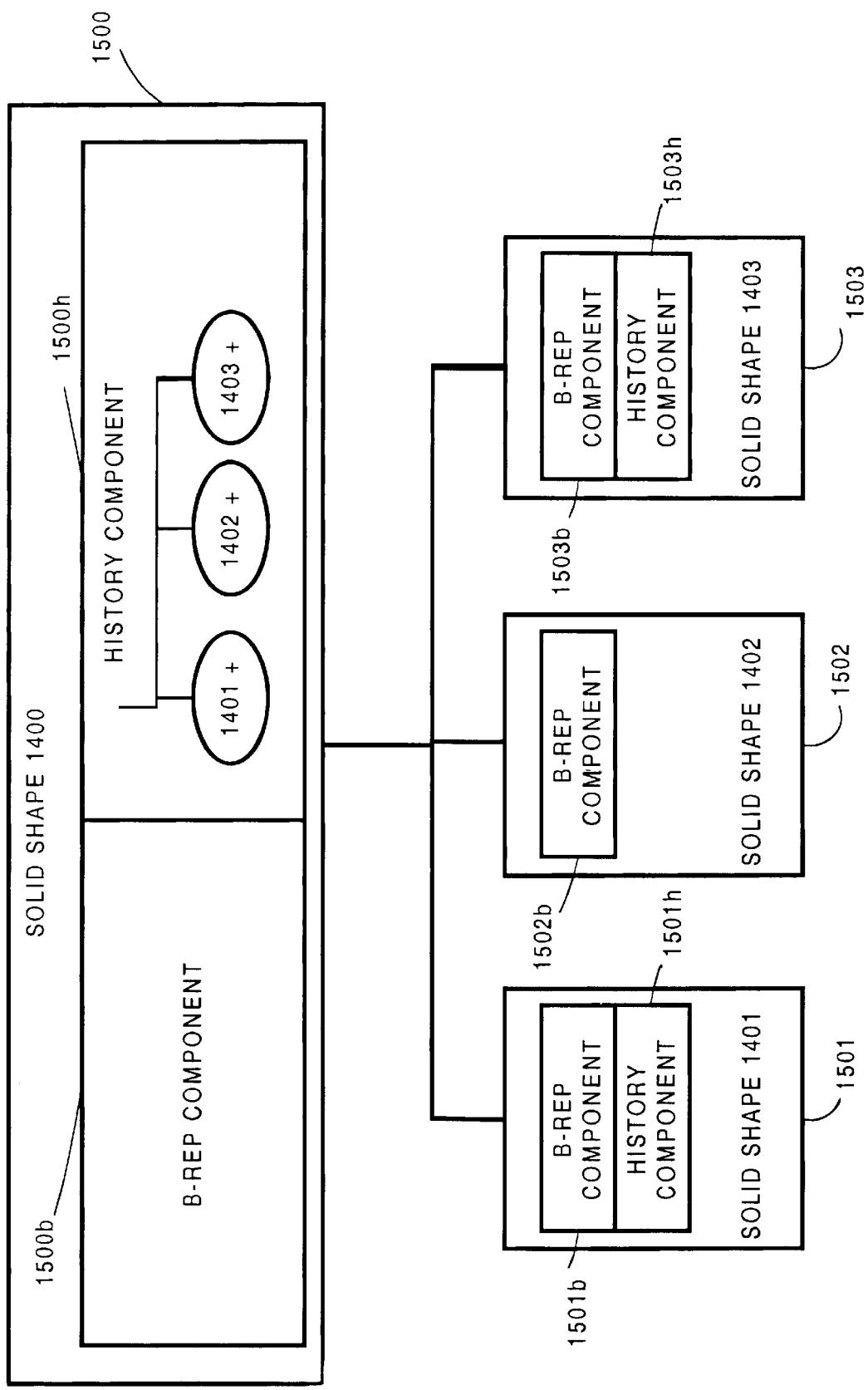

Step 9-6 of reconversion procedure of program 500 shows the history component 1500h of object 1500 for solid shape 1400 being modified to reflect inclusion of the new solid shape 1503 (see FIG. 15E). Thereafter, at step 9-7 and as illustrated in FIG. 15F, the newly created feature-based solid shape 1503 is inserted into the CSG tree. At this point, the entire solid part 1400 including the newly created feature-based solid shape 1503 can be visually generated on the screen as (at least a subset of) the CSG tree is re-evaluated at step 9-8.

Thus, it has been described above with reference to FIG. 9A and FIG. 9B, and illustrated by FIG. 15a–FIG. 15F, how a direct face modeled or D-Shape solid shape, or subset of user-designated faces, can be reconverted to a feature base modeled solid shape.

Figure 10:
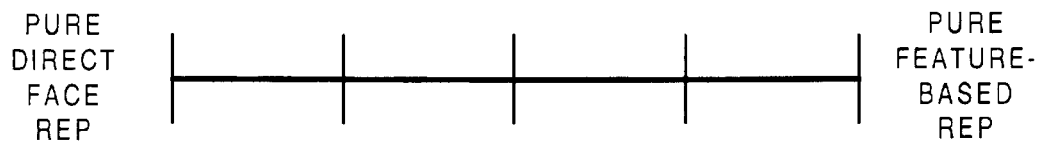
FIG. 10 is a graph showing that the solid shapes comprising an assembly or scene can be selectively apportioned between feature-based representation and direct face representation.

The present invention thus provides a scalable, hybrid three dimensional geometric modeling system which includes both feature-based and direct face representation modeling. By scalable is meant that the user and/or program 500 can select which of the solid shapes in a part have a feature-based representation and which of the solid shapes have a direct face representation. As shown in FIG. 10, the part can range from a first extreme of having all its solid shapes with feature-based representation to a second extreme of having all its solid shapes with direct face representation, or any selectable intermediate position along the graph of FIG. 10 wherein a variable subset of solid shapes has the feature-based representation while a complementary and correspondingly variable second subset of solid shapes has the direct face representation. Moreover, in converting one or more feature-based solid shapes to a direct face solid shape (D-Shape), the present invention keeps a historical consistency for the resulting geometrical and topological boundary representation information for the D-Shape.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer program product which provides a visual depiction of a three dimensional object upon a display device, the three dimensional object comprising plural solid shapes, the program comprising computer readable code stored in a memory, the computer readable code being executable on a processor to which information is input via a user input device;
   wherein, in depicting the three dimensional object, the program uses a feature-based data structure for at least one of the solid shapes comprising the three dimensional object; and
   wherein, when input from the user input device designates a designated solid shape, the computer program product creates a direct face data structure for the designated solid shape by performing the steps of:
   generating a boundary representation for the D-Shape;
   using a topology-changeable local operation to generate a modified boundary representation for the D-Shape; and then as a separate step
   modifying the history of the three dimensional object.

2. The computer program product of claim 1, wherein the program also determines if the direct face data structure should also encompass any other solid shapes comprising the three dimensional object.

3. The computer program product of claim 2, wherein the program determines if the direct face data structure should also encompass any of the following:
   adjacent solid shapes which are adjacent the designated solid shape;
   depending solid shapes that are included in a definitional component of any other solid shape that is to be converted to a direct face data structure;
   space overlapping solid shapes that have a spatial overlap with the designated solid shape and conflicting order requirements.

4. A computer program product which provides a visual depiction of a three dimensional object upon a display device, the three dimensional object comprising plural solid shapes, the program comprising computer readable code stored in a memory, the computer readable code being executable on a processor to which information is input via a user input device;
   wherein, in depicting the three dimensional object, the program uses a feature-based data structure for at least one of the solid shapes comprising the three dimensional object; and
   wherein, when input from the user input device designates a designated solid shape, the computer program product creates a direct face data structure for the designated solid shape;
   wherein in creating a direct face data structure for the designated solid shape, the program performs the steps of:
   determining what other solid shapes should be included in the D-Shape;
   generating a boundary representation for the D-Shape;
   using a topology-changeable local operation to generate a modified boundary representation for the D-Shape;
   modifying the history of the three dimensional object;
   including the modified boundary representation for the D-Shape with the data structure for the solid shape;
   updating at least part of a history of the three dimensional object.

5. The computer program product of claims 1 or 4, wherein the direct face data structure for the designated solid shape is included in a CSG tree for the three dimensional object.

6. The computer program product of claims 1 or 4, wherein, in response to the user input device, the program reconstructs a feature-based data structure for the solid shape which was converted to the direct face data structure.

7. The computer program product of claim 6, wherein the program product reconstructs the feature-based data structure by growing a selected face until a recognizable boundary is encountered.

8. The computer program product of claim 7, wherein encountering the recognizable boundary results in one of a blend, direct face solid shape, extruded shape, or turn shape.

9. The computer program product of claims 1 or 4, wherein the input from the user input device indicates that at least two solid shapes are to be combined.

10. A computer program product which provides a visual depiction of a three dimensional object upon a display device, the three dimensional object comprising plural solid shapes, the program comprising computer readable code stored in a memory, the computer readable code being executable on a processor to which information is input via a user input device;
    wherein, in depicting the three dimensional object, the program initially uses a feature-based data structure for the plural solid shapes; and
    wherein, when input from the user input device designates a designated solid shape, the computer program product converts the feature-based data structure of the designated solid shape to a direct face data structure of the designated solid shape in a manner to keep a history of the three dimensional object consistent with a resulting boundary representation component of the three dimensional object.

11. The computer program product of claim 10, wherein the direct face data structure for the designated solid shape is included in a CSG tree for the three dimensional object.

12. The computer program product of claim 10, the program also determines if the direct face data structure should also encompass any solid shapes comprising the three dimensional object in addition to the designated solid shape.

13. The computer program product of claim 12, wherein the program determines if the direct face data structure should also encompass any of the following:
    adjacent solid shapes which are adjacent the designated solid shape;
    depending solid shapes that are included in a definitional component of any other solid shape that is to be converted to a direct face data structure;

space overlapping solid shapes that have a spatial overlap with the designated solid shape and conflicting order requirements.

14. The computer program product of claim 10, wherein, in response to the user input device, the program reconstructs a feature-based data structure for the solid shape having a data structure that was converted to the direct face data structure.

15. The computer program product of claim 14, wherein the program product reconstructs the feature-based data structure by growing a selected face until a recognizable boundary is encountered.

16. The computer program product of claim 15, wherein encountering the recognizable boundary is results in one of a blend, direct face solid shape, extruded shape, or turn shape.

17. The computer program product of claim 10, wherein in creating a direct face data structure for the designated solid shape, the program performs the steps of:
   determining what other solid shapes should be included in the D-Shape;
   generating a boundary representation for the D-Shape;
   using a topology-changeable local operation to generate a modified boundary representation for the D-Shape;
   modifying the history of the three dimensional object;
   including the modified boundary representation for the D-Shape with the data structure for the solid shape;
   updating at least part of a history of the three dimensional object.

18. A computer program product which provides a visual depiction of a three dimensional object upon a display device, the three dimensional object comprising plural solid shapes, the program comprising computer readable code stored in a memory, the computer readable code being executable on a processor to which information is input via a user input device;
   wherein, in depicting the three dimensional object, the program initially uses a feature-based data structure for the plural solid shapes; and
   wherein, in response to input from the user input device, the program replaces the feature-based data structure of at least some of the plural solid shapes with a direct face data structure.

19. The computer program product of claim 18, wherein, in response to further input from the user input device, the program reconstructs, using the direct face data structure, a feature-based data structure for a reconstructed solid shape.

20. The computer program product of claim 19, wherein the program reconstructs the feature-based data structure for the reconstructed solid shape by growing a selected face until a recognizable boundary is encountered.

21. The computer program product of claim 20, wherein encountering the recognizable boundary results in one of a blend, direct face solid shape, extruded shape, or turn shape.

22. The computer program product of claim 18, wherein the direct face data structure is included in a CSG tree for the three dimensional object.

23. The computer program product of claim 18, wherein in creating the direct face data structure, the program performs the steps of:
   determining what other solid shapes should be included in the D-Shape;
   generating a boundary representation for the D-Shape;
   using a topology-changeable local operation to generate a modified boundary representation for the D-Shape;
   modifying the history of the three dimensional object;
   including the modified boundary representation for the D-Shape with the data structure for the solid shape;
   updating at least part of a history of the three dimensional object.

24. The computer program product of claim 18, wherein in creating a direct face data structure for the designated solid shape, the program performs the steps of:
   generating a boundary representation for the D-Shape;
   using a topology-changeable local operation to generate a modified boundary representation for the D-Shape; and then as a separate step modifying the history of the three dimensional object.

25. A three dimensional geometric modeling system comprising:
   a processor which executes a program comprising set of coded instructions stored in a memory;
   a display device upon which, when executed, the program provides a visual depiction of a three dimensional object, the three dimensional object comprising plural solid shapes,
   a user input device for inputting information to the processor;
   wherein, in depicting the three dimensional object, the program uses a feature-based data structure for at least one of the solid shapes comprising the three dimensional object; and
   wherein, when input from the user input device designates a designated solid shape, the computer program product creates a direct face data structure for the designated solid shape by converting the feature-based data structure of the designated solid shape to the direct face data structure.

26. The system of claim 25, wherein the direct face data structure for the designated solid shape is included in a CSG tree for the three dimensional object.

27. The system of claim 25, wherein the program also determines if the direct face data structure should also encompass any other solid shapes comprising the three dimensional object.

28. The system of claim 27, wherein the program determines if the direct face data structure should also encompass any of the following:
   adjacent solid shapes which are adjacent the designated solid shape;
   depending solid shapes that are included in a definitional component of any other solid shape that is to be converted to a direct face data structure;
   space overlapping solid shapes that have a spatial overlap with the designated solid shape and conflicting order requirements.

29. A three dimensional geometric modeling system comprising:
   a processor which executes a program comprising set of coded instructions stored in a memory;
   a display device upon which, when executed, the program provides a visual depiction of a three dimensional object, the three dimensional object comprising plural solid shapes,
   a user input device for inputting information to the processor;
   wherein, in depicting the three dimensional object, the program uses a feature-based data structure for at least one of the solid shapes comprising the three dimensional object; and wherein, when input from the user input device designates a designated solid shape, the computer program product creates a direct face data structure for the designated solid shape wherein, in response to the user input device, the program reconstructs a feature-based data structure for the solid shape now having the direct face data structure by growing a selected face until a recognizable boundary is encountered, and wherein encountering the recognizable boundary results in one of a blend, direct face solid shape, extruded shape, or turn shape.

30. A three dimensional geometric modeling system comprising:

a processor which executes a program comprising set of coded instructions stored in a memory;

a display device upon which, when executed, the program provides a visual depiction of a three dimensional object, the three dimensional object comprising plural solid shapes, a user input device for inputting information to the processor;

wherein, in depicting the three dimensional object, the program uses a feature-based data structure for at least one of the solid shapes comprising the three dimensional object;

wherein, when input from the user input device designates a designated solid shape, the computer program product creates a direct face data structure for the designated solid shape by performing the steps of:

determining what other solid shapes should be included in the D-Shape;

generating a boundary representation for the D-Shape;

using a topology-changeable local operation to generate a modified boundary representation for the D-Shape;

modifying the history of the three dimensional object;

including the modified boundary representation for the D-Shape with the data structure for the solid shape;

updating at least part of a history of the three dimensional object.

31. A three dimensional geometric modeling system comprising:

a processor which executes a program comprising set of coded instructions stored in a memory;

a display device upon which, when executed, the program provides a visual depiction of a three dimensional object, the three dimensional object comprising plural solid shapes, a user input device for inputting information to the processor;

wherein, in depicting the three dimensional object, the program uses a feature-based data structure for at least one of the solid shapes comprising the three dimensional object; and wherein, when input from the user input device designates a designated solid shape, the computer program product creates a direct face data structure for the designated solid shape;

wherein the input from the user input device indicates that at least two solid shapes are to be combined.

32. A three dimensional geometric modeling system comprising:

a processor which executes a program comprising set of coded instructions stored in a memory;

a display device upon which, when executed, the program provides a visual depiction of a three dimensional object, the three dimensional object comprising plural solid shapes, a user input device for inputting information to the processor;

wherein, in depicting the three dimensional object, the program initially uses a feature-based data structure for the plural solid shapes; and wherein, when input from the user input device designates a designated solid shape, the computer program product converts the feature-based data structure of the designated solid shape to a direct face data structure of the designated solid shape in a manner to keep a history of the three dimensional object consistent with a resulting boundary representation component of the three dimensional object.

33. The system of claim 32, wherein the direct face data structure for the designated solid shape is included in a CSG tree for the three dimensional object.

34. The system of claim 32, the program also determines if the direct face data structure should also encompass any solid shapes comprising the three dimensional object in addition to the designated solid shape.

35. The system of claim 34, wherein the program determines if the direct face data structure should also encompass any of the following:

adjacent solid shapes which are adjacent the designated solid shape;

depending solid shapes that are included in a definitional component of any other solid shape that is to be converted to a direct face data structure;

space overlapping solid shapes that have a spatial overlap with the designated solid shape and conflicting order requirements.

36. The system of claim 32, wherein, in response to the user input device, the program reconstructs a feature-based data structure for the solid shape having a data structure that was converted to the direct face data structure.

37. The system of claim 36, wherein the program product reconstructs the feature-based data structure by growing a selected face until a recognizable boundary is encountered.

38. The system of claim 37, wherein encountering the recognizable boundary results in one of a blend, direct face solid shape, extruded shape, or turn shape.

39. The system of claim 32, wherein in creating a direct face data structure for the designated solid shape, the program performs the steps of:

determining what other solid shapes should be included in the D-Shape;

generating a boundary representation for the D-Shape;

using a topology-changeable local operation to generate a modified boundary representation for the D-Shape;

modifying the history of the three dimensional object;

including the modified boundary representation for the D-Shape with the data structure for the solid shape;

updating at least part of a history of the three dimensional object.

40. A three dimensional geometric modeling system comprising:

a processor which executes a program comprising set of coded instructions stored in a memory;

a display device upon which, when executed, the program provides a visual depiction of a three dimensional object, the three dimensional object comprising plural solid shapes, a user input device for inputting information to the processor;

wherein, in depicting the three dimensional object, the program initially uses a feature-based data structure for the plural solid shapes; and wherein, in response to input from the user input device, the program replaces the feature-based data structure of at least some of the plural solid shapes with a direct face data structure.

41. The system of claim 40, wherein, in response to further input from the user input device, the program reconstructs, using the direct face data structure, a feature-based data structure for a reconstructed solid shape.

42. The system of claim 41, wherein the program reconstructs the feature-based data structure for the reconstructed solid shape by growing a selected face until a recognizable boundary is encountered.

43. The system of claim 42, wherein encountering of the recognizable boundary results in one of a blend, direct face solid shape, extruded shape, or turn shape.

44. The system of claim 40, wherein the direct face data structure is included in a CSG tree for the three dimensional object.

45. The system of claim 40, wherein in creating the direct face data structure, the program performs the steps of:
   determining what other solid shapes should be included in the D-Shape;
   generating a boundary representation of the D-Shape;
   using a topology-changeable local operation to generate a modified boundary representation for the D-Shape;
   modifying the history of the three dimensional object;
   including the modified boundary representation for the D-Shape with the data structure for the solid shape;
   updating at least part of a history of the three dimensional object.

46. The system of claim 40, wherein the at least some of the plural solid shapes for which the program replaces the feature-based data structure with the direct face data structure are selected by a user using the user input device.

47. A computer program product which provides a visual depiction of a three dimensional object upon a display device, the three dimensional object comprising plural solid shapes, the program comprising computer readable code stored in a memory, the computer readable code being executable on a processor to which information is input via a user input device;
   wherein, in depicting the three dimensional object, the program uses a feature-based data structure for at least one of the solid shapes comprising the three dimensional object; and
   wherein, when input from the user input device designates a designated solid shape, the computer program product determines which other of the plural solid shapes should be included in a combination with the designated solid shape and included in a direct face data structure for the combination.

48. The computer program product of claim 47, wherein the direct face data structure for the designated solid shape is included in a CSG tree for the three dimensional object.

49. The computer program product of claim 47, wherein the program determines if the combination should also encompass any of the following:
   adjacent solid shapes which are adjacent the designated solid shape;
   depending solid shapes that are included in a definitional component of any other solid shape that is to be converted to a direct face data structure;
   space overlapping solid shapes that have a spatial overlap with the designated solid shape and conflicting order requirements.

50. A three dimensional geometric modeling system comprising:
   a processor which executes a program comprising set of coded instructions stored in a memory;
   a display device upon which, when executed, the program provides a visual depiction of a three dimensional object, the three dimensional object comprising plural solid shapes,
   a user input device for inputting information to the processor;
   wherein, in depicting the three dimensional object, the program uses a feature-based data structure for at least one of the solid shapes comprising the three dimensional object; and
   wherein, when input from the user input device designates a designated solid shape, the computer program product determines which other of the plural solid shapes should be included in a combination with the designated solid shape and included in a direct face data structure for the combination.

51. The system of claim 50, wherein the direct face data structure for the designated solid shape is included in a CSG tree for the three dimensional object.

52. The system of claim 51, wherein the program determines if the combination should also encompass any of the following:
   adjacent solid shapes which are adjacent the designated solid shape;
   depending solid shapes that are included in a definitional component of any other solid shape that is to be converted to a direct face data structure;
   space overlapping solid shapes that have a spatial overlap with the designated solid shape and conflicting order requirements.

53. A computer program product which provides a visual depiction of a three dimensional object upon a display device, the three dimensional object comprising plural solid shapes, the program comprising computer readable code stored in a memory, the computer readable code being executable on a processor to which information is input via a user input device;
   wherein, in depicting the three dimensional object, the program uses a first type data structure for at least one of the solid shapes comprising the three dimensional object; and
   wherein, when input from the user input device designates a designated solid shape, the computer program product creates a second type data structure for the designated solid shape;
   wherein, in response to the user input device, the program reconstructs a first type data structure for the solid shape which was converted to the second type data structure by growing a selected face until a recognizable boundary is encountered;
   wherein encountering the recognizable boundary results in one of a blend, direct face solid shape, extruded shape, or turn shape.

54. The computer program product of claim 53, wherein the second type data structure for the designated solid shape is included in a CSG tree for the three dimensional object.

55. The computer program product of claim 53, wherein the program also determines if the second type data structure should also encompass any other solid shapes comprising the three dimensional object.

56. The computer program product of claim 55, wherein the program determines if the second type data structure should also encompass any of the following:

adjacent solid shapes which are adjacent the designated solid shape;

depending solid shapes that are included in a definitional component of any other solid shape that is to be converted to a direct face data structure;

space overlapping solid shapes that have a spatoial overlap with the designated solid shape and conflicting order requirements.

57. A three dimensional geometric modeling system comprising:

a processor which executes a program comprising set of coded instructions stored in a memory;

a display device upon which, when executed, the program provides a visual depiction of a three dimensional object, the three dimensional object comprising plural solid shapes, a user input device for inputting information to the processor;

wherein, in depicting the three dimensional object, the program uses a first type data structure for at least one of the solid shapes comprising the three dimensional object; and wherein, when input from the user input device designates a designated solid shape, the computer program product creates a second type data structure for the designated solid shape;

wherein, in response to the user input device, the program reconstructs a first type data structure for the solid shape which was converted to the second type data structure by growing a selected face until a recognizable boundary is encountered;

wherein encountering the recognizable boundary results in one of a blend, direct face solid shape, extruded shape, or turn shape.

58. The system of claim 57, wherein the second type data structure for the designated solid shape is included in a CSG tree for the three dimensional object.

59. The system of claim 57, wherein the program also determines if the second type data structure should also encompass any other solid shapes comprising the three dimensional object.

60. The system of claim 59, wherein the program determines if the second type data structure should also encompass any of the following:

adjacent solid shapes which are adjacent the designated solid shape;

depending solid shapes that are included in a definitional component of any other solid shape that is to be converted to a direct face data structure;

space overlapping solid shapes that have a spatial overlap with the designated solid shape and conflicting order requirements.

61. A computer program product which provides a visual depiction of a three dimensional object upon a display device, the three dimensional object comprising plural solid shapes, the program comprising computer readable code stored in a memory, the computer readable code being executable on a processor to which information is input via a user input device;

wherein, in response to the user input device, the program generates a new feature-based data structure for at least a subset of faces of one or more of the plural solid shapes which do not have a feature-based data structure.

62. The computer program product of claim 61, wherein in response to a selection of selected faces of the one or more plural solid shapes which do not have a feature-based data structure, the program performs the following:

removes the selected faces from a boundary representation component of objects of solid shapes in which the selected faces were formerly included;

creates a boundary representation component for the selected faces;

creates an object for the new feature-based data structure, the object including the boundary representation component for the selected faces;

modifies a history component of any compound solid shapes in which the new feature-based data structure is to be included;

includes the object for the new feature-based data structure in the CSG tree of any compound solid shapes in which the new feature-based data structure is to be included.

63. The computer program product of claim 62, wherein the program further performs the step of healing the boundary representation component of objects of solid shapes in which the selected faces were formerly included.

64. The computer program product of claim 61, wherein the program determines the subset of faces by growing a selected face until a recognizable boundary is encountered.

65. The computer program product of claim 64, wherein encountering the recognizable boundary results in one of a blend, direct face solid shape, extruded shape, or turn shape.

66. A three dimensional geometric modeling system comprising:

a processor which executes a program comprising set of coded instructions stored in a memory;

a display device upon which, when executed, the program provides a visual depiction of a three dimensional object, the three dimensional object comprising plural solid shapes, a user input device for inputting information to the processor;

wherein, in depicting the three dimensional object, the program generates a new feature-based data structure for at least a subset of faces of one or more of the plural solid shapes which do not have a feature-based data structure.

67. The system of claim 66, wherein in response to a selection of selected faces of the one or more plural solid shapes which do not have a feature-based data structure, the program performs the following:

removes the selected faces from a boundary representation component of objects of solid shapes in which the selected faces were formerly included;

creates a boundary representation component for the selected faces;

creates an object for the new feature-based data structure, the object including the boundary representation component for the selected faces;

modifies a history component of any compound solid shapes in which the new feature-based data structure is to be included;

includes the object for the new feature-based data structure in the CSG tree of any compound solid shapes in which the new feature-based data structure is to be included.

68. The system of claim 67, wherein the program further performs the step of healing the boundary representation component of objects of solid shapes in which the selected faces were formerly included.

69. The system of claim 67, wherein the program determines the subset of faces by growing a selected face until a recognizable boundary is encountered.

70. The system of claim 69, wherein encountering the recognizable boundary results in one of a blend, direct face solid shape, extruded shape, or turn shape.

* * * * *